US011853640B2

(12) United States Patent
Lee et al.

(10) Patent No.: US 11,853,640 B2
(45) Date of Patent: Dec. 26, 2023

(54) DISPLAY APPARATUS AND METHOD OF CONTROLLING THE SAME

(71) Applicant: SAMSUNG ELECTRONICS CO., LTD., Suwon-si (KR)

(72) Inventors: Hyeonji Lee, Suwon-si (KR); Yonghwan Kwon, Suwon-si (KR); Soyoung Shin, Suwon-si (KR); Jisoo Yoon, Suwon-si (KR); Hajeong Yun, Suwon-si (KR); Sangjoon Lee, Suwon-si (KR); Eunjin Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/140,311

(22) Filed: Jan. 4, 2021

(65) Prior Publication Data
US 2021/0208837 A1   Jul. 8, 2021

(30) Foreign Application Priority Data

Jan. 2, 2020   (KR) .................. 10-2020-0000139

(51) Int. Cl.
*G06F 3/16* (2006.01)
*H04N 21/41* (2011.01)
*H04R 3/12* (2006.01)

(52) U.S. Cl.
CPC .......... *G06F 3/16* (2013.01); *H04N 21/41265* (2020.08); *H04R 3/12* (2013.01); *H04R 2420/07* (2013.01)

(58) Field of Classification Search
CPC ... F06F 3/16; G06F 3/165; H04R 5/04; H04R 3/12; H04S 7/40
See application file for complete search history.

(56) References Cited

U.S. PATENT DOCUMENTS

RE43,915 E  *  1/2013  Lee  ............... H04M 1/72415
                                                    455/66.1
8,473,994 B2 * 6/2013 Blackburn  ......... H04N 21/4882
                                                    725/110
(Continued)

FOREIGN PATENT DOCUMENTS

KR   10-2008-0076327       8/2008
KR   10-2011-0072650       6/2011
(Continued)

OTHER PUBLICATIONS

International Search Report dated Apr. 19, 2021 from International Application No. PCT/KR2020/019431.

(Continued)

*Primary Examiner* — Olga V Merkoulova
(74) *Attorney, Agent, or Firm* — STAAS & HALSEY LLP

(57) ABSTRACT

Provided is a display apparatus including: a display; a content interface; a communication interface; and a controller configured to: control the display to display an image corresponding to the broadcast signal received through the content interface; receive operation information of an external audio apparatus through at least one interface selected from the content interface and the communication interface; and control the display to display a control menu for providing the operation information of the external audio apparatus and acquiring a user input related to an operation of the external audio apparatus in response to the operation information of the external audio apparatus being received.

20 Claims, 20 Drawing Sheets

(56) References Cited

U.S. PATENT DOCUMENTS

| | | | |
|---|---|---|---|
| 9,137,835 B2* | 9/2015 | Sato | H04N 7/52 |
| 2004/0148632 A1* | 7/2004 | Park | H04N 5/765 |
| | | | 348/E5.103 |
| 2005/0154766 A1* | 7/2005 | Huang | H04N 21/485 |
| 2008/0320539 A1* | 12/2008 | Ohkita | H04N 21/485 |
| | | | 725/118 |
| 2011/0150431 A1* | 6/2011 | Klappert | H04N 21/84 |
| | | | 386/277 |
| 2011/0267291 A1* | 11/2011 | Choi | H04N 21/4222 |
| | | | 345/173 |
| 2012/0206650 A1* | 8/2012 | Lin | H04N 21/43072 |
| | | | 348/E9.034 |
| 2014/0359665 A1 | 12/2014 | Sung et al. | |
| 2014/0376873 A1* | 12/2014 | Tanaka | H04N 21/42204 |
| | | | 386/203 |
| 2015/0264028 A1* | 9/2015 | Kim | H04L 63/0853 |
| | | | 726/3 |
| 2017/0099325 A1* | 4/2017 | Steiner | H04L 65/1069 |
| 2017/0168772 A1* | 6/2017 | Lim | G06F 3/165 |
| 2017/0235461 A1 | 8/2017 | Oh et al. | |
| 2017/0318327 A1* | 11/2017 | Mun | H04N 21/42204 |
| 2018/0167577 A1* | 6/2018 | Ryu | H04N 21/485 |
| 2019/0089925 A1 | 3/2019 | Lee et al. | |
| 2019/0373313 A1 | 12/2019 | Jackson et al. | |

FOREIGN PATENT DOCUMENTS

| | | |
|---|---|---|
| KR | 10-2015-0139417 | 12/2015 |
| KR | 10-2018-0059423 | 6/2018 |
| KR | 10-2018-0067108 | 6/2018 |
| KR | 10-2019-0048337 | 5/2019 |
| KR | 10-2021-0087190 | 7/2021 |
| WO | WO 2015/174753 A1 | 11/2015 |

OTHER PUBLICATIONS

Extended European Search Report dated May 10, 2021 from European Application No. 20217700.2.

Office Action dated Jul. 20, 2023 in European Patent Application No. 20 217 700.2.

* cited by examiner

FIG. 1
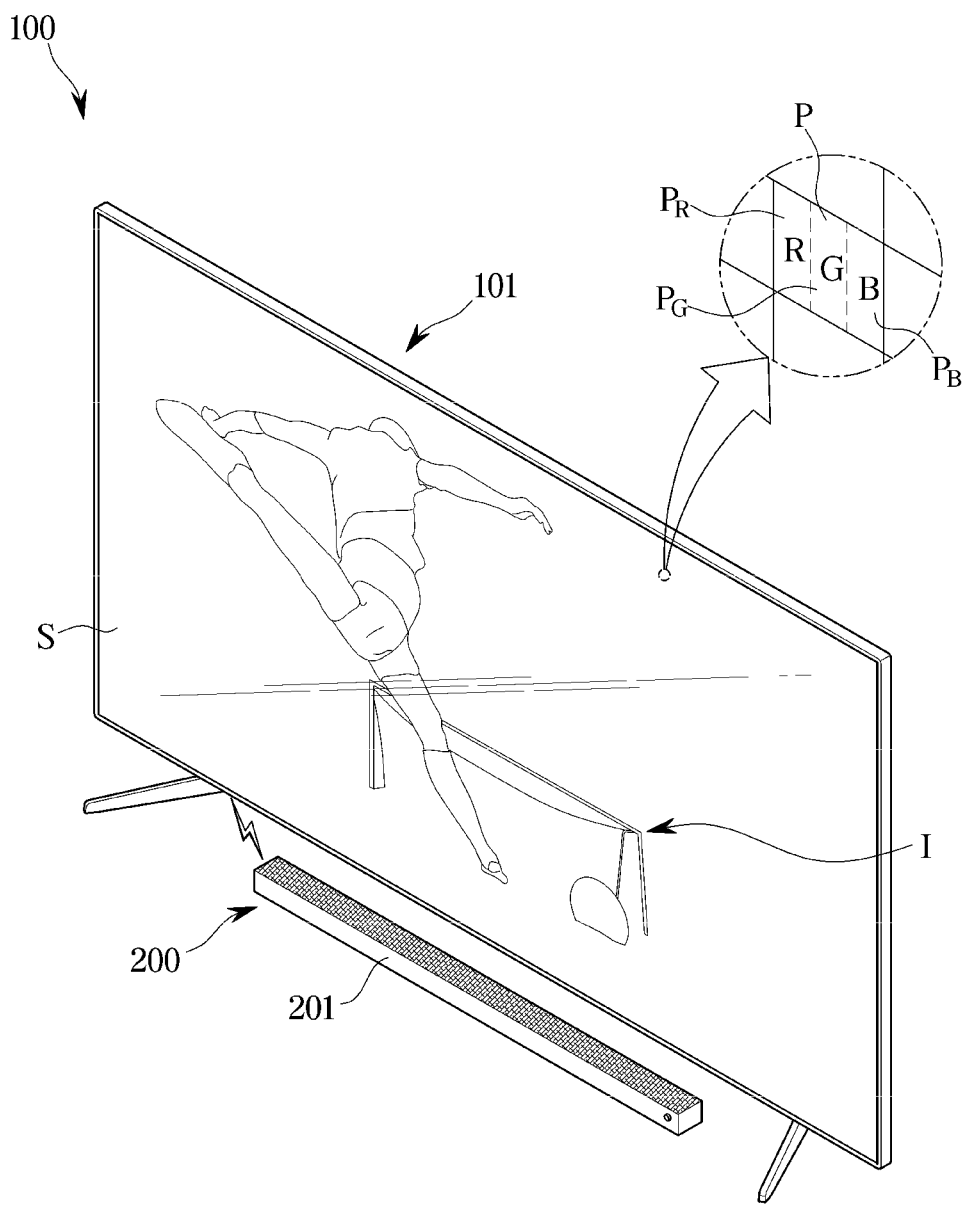
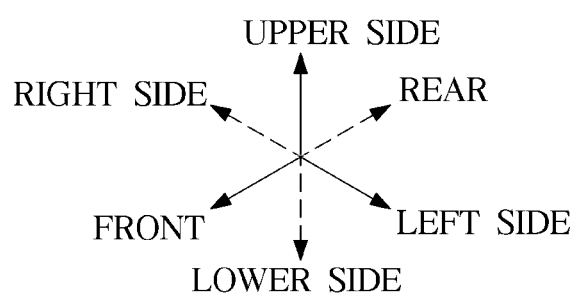

DISPLAY APPARATUS AND METHOD OF CONTROLLING THE SAME

CROSS-REFERENCE TO RELATED APPLICATIONS

This application is based on and claims priority under 35 U.S.C. § 119 to Korean Patent Application No. 10-2020-0000139, filed on Jan. 2, 2020 in the Korean Intellectual Property Office, the disclosure of which is incorporated herein by reference.

BACKGROUND

1. Field

The disclosure relates to a display apparatus and a method of controlling the same, and more specifically, to a display apparatus connected to an audio apparatus in a wired or wireless manner, and a method of controlling the same.

2. Description of the Related Art

In general, a display apparatus is an output device that visually displays image information received from an external device or stored inside in the display apparatus to a user, and is used in various fields, such as homes and businesses.

In order to assist audio output, the display apparatus may be connected to an audio apparatus in a wired or wireless manner. For example, the display apparatus may transmit an electrical audio signal (or audio data) to the audio apparatus, and the audio apparatus may output sound according to the audio signal received from the display apparatus.

Recent audio apparatuses have a compact size unlike the conventional audio apparatuses. For example, in the audio apparatuses, an input button and a display are minimized and a speaker for outputting sound occupies most area of a main body.

In addition, the interaction between the audio apparatus and the user has been weakened. For example, recent audio apparatuses may represent the operation of the audio apparatus only with a light emitting diode (LED).

With such a configuration, the user may not accurately recognize the operating state of the audio apparatus.

SUMMARY

Therefore, it is an object of the disclosure to provide a display apparatus capable of displaying information about an operation of an audio apparatus connected thereto, and a method of controlling the same.

It is another object of the disclosure to provide a display apparatus capable of displaying information about an operation of an audio apparatus when an audio apparatus is solely in operation, and a method of controlling the same.

It is another object of the disclosure to provide a display apparatus capable of minimizing power consumption for displaying information about an operation of an audio apparatus and a method of controlling the same.

Additional aspects of the disclosure will be set forth in part in the description which follows and, in part, will be obvious from the description, or may be learned by practice of the disclosure.

According to an aspect of the disclosure, there is provided a display apparatus: including a display, a content interface; a communication interface, and a controller configured to control the display to display an image corresponding to a broadcast signal received through the content interface, receive operation information of an external audio apparatus through at least one interface selected from the content interface and the communication interface, and control the display to display a control menu for providing the operation information of the external audio apparatus and controlling the external audio apparatus on the basis of the operation information of the external audio apparatus.

According to another aspect of the disclosure, there is provided a method of controlling a display apparatus including a communication interface and a content interface, the method including: displaying an image corresponding to a broadcast signal received through the content interface, receiving operation information of an external audio apparatus through at least one interface selected from the content interface and the communication interface, and displaying a control menu for providing the operation information of the external audio apparatus and controlling the external audio apparatus on a display on the basis of the operation information of the external audio apparatus.

According to another aspect of the disclosure, there is provided a display apparatus including a display, a user inputter, a content interface, a communication interface, and a controller configured to: control the display to display an image corresponding to a broadcast signal received through the content interface; receive information about an application related to audio reproduction of an external user device communicating with an external audio apparatus from the external audio apparatus through at least one interface selected from the content interface and the communication interface; display a control menu for providing information about the application of the external user device and executing the application of the external user device; acquire a user input for executing the application of the external user device through the control menu displayed on the display and the user inputter; and transmit the user input to the external audio apparatus through the at least one interface such that the user input is transmitted to the external user device.

Additional aspects of the disclosure will be set forth in part in the description which follows and, in part, will be obvious from the description, or may be learned by practice of the disclosure

BRIEF DESCRIPTION OF THE DRAWINGS

These and/or other aspects and advantages will become apparent and more readily appreciated from the following description of the embodiments, taken in conjunction with the accompanying drawings of which:

FIG. 1 illustrates a display apparatus and an audio apparatus connected to the display apparatus according to an embodiment;

DETAILED DESCRIPTION

Figure 2:
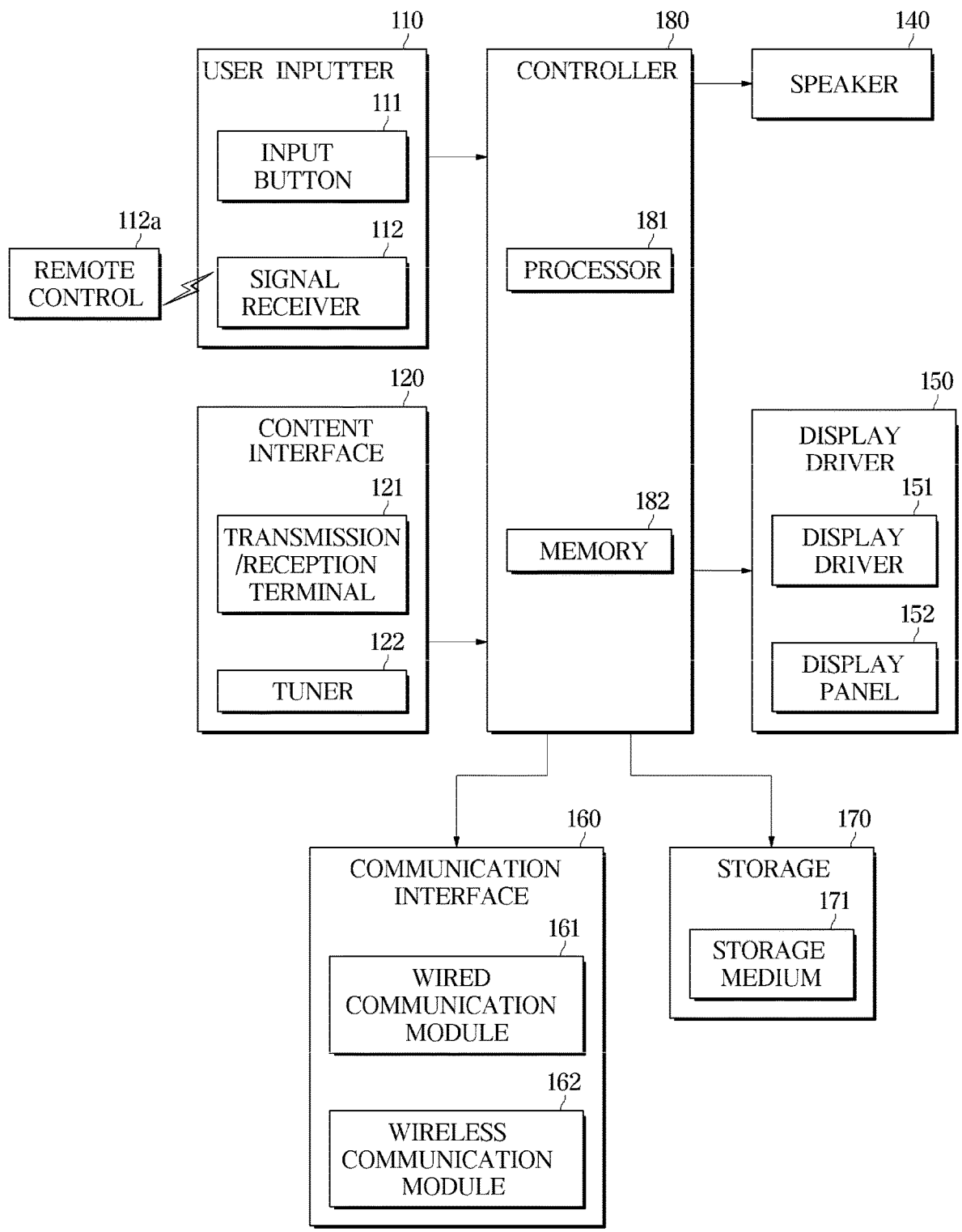
FIG. 2 illustrates a configuration of the display apparatus according to the embodiment.

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. The progression of processing operations described is an example; however, the sequence of and/or operations is not limited to that set forth herein and may be changed as is known in the art, with the exception of operations necessarily occurring in a particular order. In addition, respective descriptions of well-known functions and constructions may be omitted for increased clarity and conciseness.

Additionally, exemplary embodiments will now be described more fully hereinafter with reference to the accompanying drawings. The exemplary embodiments may, however, be embodied in many different forms and should not be construed as being limited to the embodiments set forth herein. These embodiments are provided so that this disclosure will be thorough and complete and will fully convey the exemplary embodiments to those of ordinary skill in the art. Like numerals denote like elements throughout.

It will be understood that, although the terms first, second, etc. may be used herein to describe various elements, these elements should not be limited by these terms. These terms are only used to distinguish one element from another. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present.

The terminology used herein is for the purpose of describing particular embodiments only and is not intended to be limiting. As used herein, the singular forms "a," "an," and "the," are intended to include the plural forms as well, unless the context clearly indicates otherwise.

Reference will now be made in detail to the exemplary embodiments of the present disclosure, examples of which are illustrated in the accompanying drawings, wherein like reference numerals refer to like elements throughout.

The expression, "at least one of a, b, and c," should be understood as including only a, only b, only c, both a and b, both a and c, both b and c, or all of a, b, and c.

Therefore, it is an object of the disclosure to provide a display apparatus capable of displaying information about an operation of an audio apparatus connected thereto, and a method of controlling the same.

It is another object of the disclosure to provide a display apparatus capable of displaying information about an operation of an audio apparatus when an audio apparatus is solely in operation, and a method of controlling the same.

It is another object of the disclosure to provide a display apparatus capable of minimizing power consumption for displaying information about an operation of an audio apparatus and a method of controlling the same.

FIG. 1 illustrates a display apparatus and an audio apparatus connected to the display apparatus according to an embodiment.

Referring to FIG. 1, a display apparatus 100 may be connected to an audio apparatus 200 in a wired/wireless manner, and may output sound through the audio apparatus 200.

The display apparatus 100 is a device capable of processing video data received from the outside and/or video data stored in the display apparatus 100, and visually displaying the processed video (a series of a plurality of images). In the following description, the display apparatus 100 is illustrated as a television (TV), but the disclosure is not limited thereto. For example, the display apparatus 100 may be implemented in various forms, such as a monitor, a portable multimedia device, a portable communication device, and a portable computing device without limitation of the name and forms as long as it can visually display an image.

In addition, the display apparatus 100 may be a large display device (Large Format Display, LFD) installed outdoors, such as a rooftop of a building or a bus stop. Here, the outdoors are not limited to an open-air place, and may include a place where a large number of people enter or exist, even inside of a building, such as subway stations, shopping malls, cinemas, companies, shops, and the like, in which the display apparatus 100 according to the embodiment may be installed.

The display apparatus 100 may receive video data and audio data from various content sources. For example, the display apparatus 100 may receive video/audio data (television broadcast content) through a broadcast reception antenna or a wired cable, receive video/audio data from a content playback device, or receive video/audio data from a content providing server of a content provider.

The display apparatus 100 may display an image corresponding to video data and output sound corresponding to audio data. For example, the display apparatus 100 may reconstruct a plurality of images included in video data and continuously display the plurality of images. In addition, the display apparatus 100 may reconstruct an audio signal included in the audio data and continuously output sound according to the audio signal.

Referring to FIG. 1, the display apparatus 100 includes a main body 101 that accommodates a plurality of parts for displaying an image, and a screen S provided at one side of the main body 101 to display an image I.

The main body 101 may form the external appearance of the display apparatus 100, and accommodate parts required for the display apparatus 100 to display an image I.

The screen S is formed on the front surface of the main body 101, and the image I, which is visual information, may be displayed on the screen S.

The screen S includes a plurality of pixels P, and the image I displayed on the screen S may be formed by a combination of light emitted from the plurality of pixels P. For example, the light emitted by the plurality of pixels P may be combined as a mosaic to form a single image I on the screen S.

The respective pixels P may emit light of various brightness and various colors.

In order to emit light of various brightness, each of the plurality of pixels P may directly emit light (a self-emissive display panel) or may transmit or block light emitted by a backlight unit or the like (a non-emissive display panel). For example, the display apparatus 100 may include a liquid crystal display panel (LCD Panel), a light emitting diode panel (LED panel), an organic light emitting diode panel (OLED panel), or a quantum dot (QD) display panel.

In order to display images of various colors, each of the plurality of pixels P may include sub-pixels Psub1, Psub2, and Psub3. For example, the sub-pixels may include a red sub-pixel that may emit red light, a green sub-pixel that may emit green light, and a blue sub-pixel that may emit blue light (an RGB pixel). For example, the sub-pixels may include a red sub-pixel, a green sub-pixel, a blue sub-pixel, and a white sub-pixel that may emit white light (an RGBW pixel). For example, the sub-pixels may include a red sub-pixel, a green sub-pixel, a blue sub-pixel, and a yellow sub-pixel that may emit yellow light (an RGBY pixel). However, the sub-pixel structure is not limited to the above, and may include various sub-pixel structures currently disclosed or to be disclosed later.

The display apparatus 100 may directly output sound according to audio data, or may transmit audio data to the audio apparatus 200 such that the audio apparatus 200 outputs sound according to the audio data.

The audio apparatus 200 is a device capable of processing audio data received from outside and/or audio data stored therein, and audibly outputting the processed sound. The name and form of the audio apparatus 200 are not limited as long as it can audibly output audio. For example, the audio apparatus 200 may be referred to as a "speaker", a "sound bar", a "bluetooth speaker", a "WiFi speaker," or an "artificial intelligence speaker".

The audio apparatus 200 may receive audio data from various content sources. For example, the audio apparatus 200 may receive audio data (radio broadcast) through a broadcast reception antenna, receive audio data from an audio playback device, or receive audio data from an audio providing server.

The audio apparatus 200 may reconstruct an audio signal included in the audio data, and continuously output sound according to the audio signal.

Referring to FIG. 1, the audio apparatus 200 may include a main body 201 accommodating a plurality of components for outputting sound, and a speaker provided at one side of the main body 201 to output sound.

The audio apparatus 200 may include one speaker or a plurality of speakers to output sound of various frequency bands. For example, the audio apparatus 200 may include a tweeter capable of outputting high-frequency sound, a mid-range speaker capable of outputting a medium-frequency sound, or a woofer capable of outputting a low-frequency sound.

The audio apparatus 200 may transmit operation information of the audio apparatus 200 to the display apparatus 100 to display an operating state of the audio apparatus 200. The audio apparatus 200 may omit a display panel for displaying an image in order to ensure a compact appearance, and may include a light emitting diode (LED) for providing only minimal information about the operation of the audio apparatus 200.

As such, the audio apparatus 200 may transmit operation information of the audio apparatus 200 to provide a user with detailed information about the operation of the audio apparatus 200.

Hereinafter, the configuration and operation of the display apparatus 100 and the audio apparatus 200 will be described in detail.

Figure 3:
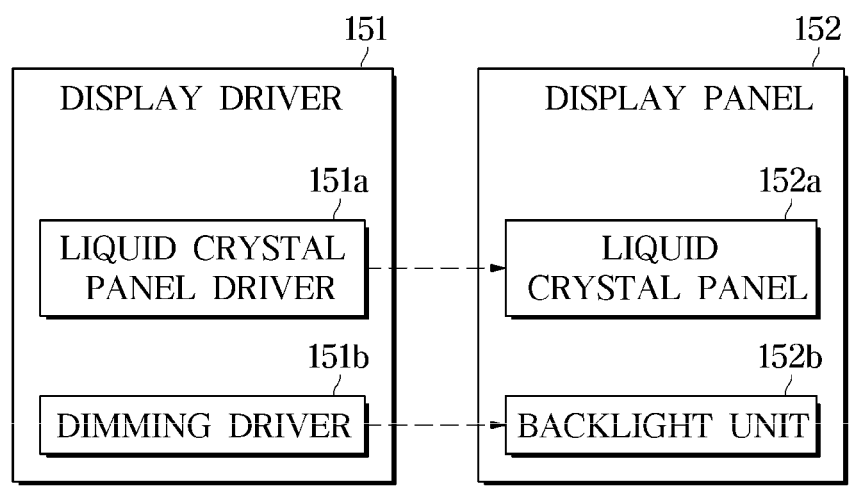
FIG. 3 illustrates an example of a display included in the display apparatus according to the embodiment.
Figure 4:
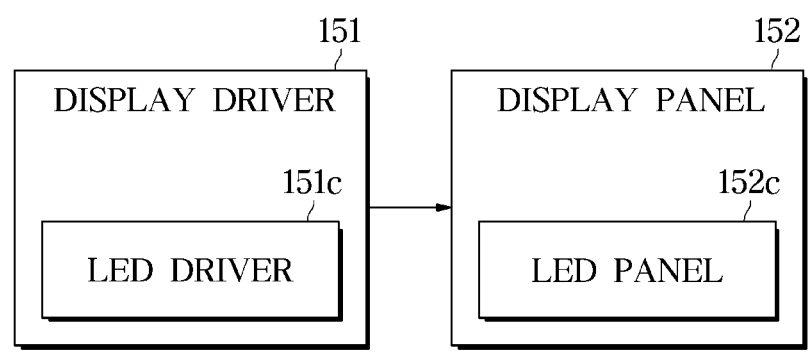
FIG. 4 illustrates an example of a display included in the display apparatus according to the embodiment.

FIG. 2 illustrates a configuration of the display apparatus according to the embodiment. FIG. 3 illustrates an example of a display included in the display apparatus according to the embodiment. FIG. 4 illustrates an example of a display included in the display apparatus according to the embodiment.

Referring to FIGS. 2, 3, and 4, the display apparatus 100 includes a user inputter 110 to receive a user input from a user, a content interface 120 to receive video data and/or audio data from content sources, a speaker 140 to output sound, a display 150 to display an image, a communication interface 160 to transmit and receive data including video/audio data to and from external devices, a storage 170 to store programs and data for controlling the operation of the display apparatus 100, and a controller 180 to process video data and/or audio data and control the operation of the display apparatus 100.

The user inputter 110 may include an input button 111 for receiving a user input. For example, the user inputter 110 may include a power button for turning on or off the display apparatus 100, a volume control button for adjusting audio volume, a source selection button for selecting a content source, and the like.

Each of the input buttons 111 may receive a user input and may output an electrical signal (voltage or current) corresponding to the user input to the controller 180, and may be implemented as various input devices, such as a push switch, a touch switch, a dial, a slide switch, a toggle switch, etc.

The user inputter 110 includes a signal receiver 112 for receiving a remote control signal of a remote control 112a. The remote control 112a for acquiring a user input may be provided separately from the display apparatus 100. The remote control 112a may acquire a user input and transmit a wireless signal (e.g., an infrared signal) corresponding to the user input to the display apparatus 100. The signal receiver 112 may receive the wireless signal (e.g., an infrared signal) from the remote control 112a and output an electrical signal (voltage or current) corresponding to the user input to the controller 180.

The content interface 120 may receive video/audio data from a content source, or transmit and receive video/audio data to and from a peripheral device (e.g., an audio apparatus).

The content interface 120 may include a transmission/reception terminal 121. The transmission/reception terminal may include a component YPbPr/RGB terminal, a composite video blanking and sync (CVBS)) terminal, an audio terminal, and the like. In addition, the transmission/reception terminal 121 may include a high definition multimedia interface (HDMI) terminal capable of transmitting and receiving video/audio data to and from peripheral devices (e.g. an audio apparatus), a universal serial bus (USB) terminal, and the like.

The content interface 120 may include a tuner 122. The tuner 122 may receive broadcast signals from a broadcast reception antenna or a wired cable and extract a broadcast signal of a channel selected by a user from the broadcast signals. For example, the tuner 122 may pass a broadcast signal having a frequency corresponding to a channel selected by a user among a plurality of broadcast signals received through a broadcast reception antenna or a wired cable, and block broadcast signals having other frequencies.

As such, the display apparatus 100 may receive video/audio data from content sources through the content interface 120. In addition, the display apparatus 100 may exchange data with the audio apparatus 200 through the content interface 120.

The speaker 140 may audibly output an audio signal. The speaker 140 may convert an audio signal output from the controller 180 into sound. For example, the speaker 140 may include a thin film that vibrates according to an audio signal, and sound may be generated by the vibration of the thin film.

The speaker 140 may include a left surround speaker disposed on the left side of the display apparatus 100 and a right surround speaker disposed on the right side of the display apparatus 100 in order to output stereo sound.

The display 150 includes a display panel 152 that visually displays an image and a display driver 151 that drives the display panel 152.

As described above, the display apparatus 100 may reconstruct a plurality of images included in video data, and may continuously display the plurality of images.

The display driver 151 may transmit to the display panel 152 an analog signal (a driving signal) for displaying each of the reconstructed plurality of images on the display panel 152.

The display driver 151 may transmit a driving signal to each of the plurality of pixels included in the display panel 152. Each of the plurality of pixels of the display panel 152 may emit light according to the driving signal, and light emitted from the plurality of pixels may be combined to form a single image.

The display panel 152 may emit light according to the driving signal received from the display driver 151, and display an image.

The display panel 152 may include pixels each serving as a unit for displaying an image. Each pixel may receive a driving signal for displaying an image from the display driver 151 and may output an optical signal corresponding to the received driving signal. In this way, the optical signals output from the plurality of pixels P are combined so that one image may be displayed on the display panel 152.

The display apparatus 100 may include various types of display panels 152 for displaying images.

For example, the display apparatus 100 may include a non-emissive display panel that displays an image by passing or blocking light emitted from a light source (a backlight unit). A liquid crystal display panel is a typical non-emissive display panel.

Referring to FIG. 3, the display panel 152 may include a liquid crystal panel 152a and a backlight unit 152b. The backlight unit 152b may include a plurality of light sources capable of emitting white light including red light, green light, and blue light. The liquid crystal panel 152a may selectively pass red light, green light, and blue light emitted from the backlight unit 152b. For example, a red sub-pixel of the liquid crystal panel 152a may selectively pass red light and block green light and blue light. A green sub-pixel of the liquid crystal panel 152a may selectively pass green light and block blue light and red light. A blue sub-pixel of the liquid crystal panel 152a may selectively pass blue light and may block red light and green light.

The display driver 151 may include a liquid crystal panel driver 151a for driving the liquid crystal panel 152a and a dimming driver 151b for driving the backlight unit 152b. The liquid crystal panel driver 151a may output a driving signal for forming an image to the liquid crystal panel 152a. The intensity (or amount of light) of light passing through each of the plurality of sub-pixels of the liquid crystal panel 152a is adjusted by the driving signal of the liquid crystal panel driver 151a, and an image is formed by the light passing through each of the plurality of sub-pixels. The dimming driver 151b may output a dimming signal for locally adjusting the brightness of the backlight unit 152b to the backlight unit 152b. The intensity (or amount of light) of light emitted from the backlight unit 152b is locally adjusted by the dimming signal, so that the contrast ratio of the image displayed on the liquid crystal panel 152a may be improved.

The dimming driver 151b and the liquid crystal panel driver 151a may operate the display panel 152. For example, the dimming driver 151b and the liquid crystal panel driver 151a may drive the display panel 152 to display an image on a portion of the display panel 152. The dimming driver 151b may drive some of light sources included in the backlight unit 152b to locally emit light, and the liquid crystal panel driver 151a may drive the liquid crystal panel 152a to pass light locally.

As another example, the display apparatus 100 may include a self-emissive display panel that displays an image using a device that emits light by itself. An OLED panel or a QD display panel is a typical self-emissive display panel.

Referring to FIG. 4, the display panel 152 includes a light emitting diode (LED) panel 152c. The LED panel 152c may include a red LED capable of emitting red light, a green LED capable of emitting green light, and a blue LED capable of emitting blue light. Each of the LEDs may function as a sub-pixel. The red, green, and blue LEDs may function as a red sub-pixel, a green sub-pixel, and a blue sub-pixel, respectively. The QD display panel may include red, green, and blue quantum dots, and each of the quantum dots may function as a sub-pixel.

The display driver 151 includes a LED driver 151c. The LED driver 151c may output a driving signal for forming an image to the LED panel 152c. By the driving signal of the LED panel 152c, driving current is supplied to the red, green, and blue LEDs, and the intensity of light (or amount of light) emitted from each of the red, green, and blue LEDs Is adjusted. An image may be formed by light emitted from the LEDs.

The LED driver 151c may locally operate the display panel 152. For example, the LED driver 151c may drive the display panel 152 to display an image on a portion of the display panel 152. The LED driver 151c may supply driving current only to some light emitting diodes in a portion generating an image.

As such, the display panel 152 may be locally operated according to a driving signal from the display driver 151. In other words, an image may be displayed on a part of the display panel 152.

The communication interface 160 may receive video/audio data from a content source.

The communication interface 160 may include a wired communication module 161 for receiving video/audio data from a content source in a wired manner, and a wireless communication module 162 for receiving video/audio data from a content source in a wireless manner.

The wired communication module 161 may receive a data stream from a content source using various communication standards. For example, the wired communication module 161 may receive video/audio data from a content source using Ethernet (Ethernet, IEEE 802.3 technology standard).

The wired communication module 161 may include a communication circuit (e.g., a network interface controller) including a processor and/or memory that modulates/modulates data for wired communication.

The wireless communication module 162 may exchange wireless signals with the audio apparatus 200 using various types of wireless communications. In addition, the wireless communication module 162 may receive a data stream from a content source via the audio apparatus 200.

For example, the wireless communication module 162 may access a wireless repeater using Wi-Fi (WiFi™, IEEE 802.11 technology standard) wireless communication, and receive video/audio data from a content source via the wireless repeater.

The Wi-Fi wireless communication may provide peer-to-peer communication between nodes (e.g., between a display apparatus and an audio apparatus) without passing through a wireless repeater. Such a direct communication using Wi-Fi wireless communication is referred to as "WiFi P2P" or "WiFi direct". The wireless communication module 162 may exchange data with the audio apparatus 200 using Wi-Fi P2P communication standards.

In addition, the wireless communication module 162 may exchange data with the audio apparatus 200 using Bluetooth (Bluetooth™, IEEE 802.15.1 technology standard) or ZigBee (ZigBee™, IEEE 802.15.4 technology standard) wireless communication. Alternatively, the wireless communication module 162 may exchange data with the audio apparatus 200 using near field communication (NFC).

The wireless communication module 162 may include a communication circuit (e.g., a wireless network interface controller) including a processor and/or memory that decodes/encodes data for wireless communication with an antenna that transmits and receives wireless signals.

As such, the display apparatus 100 may exchange data with the audio apparatus 200 through the communication interface 160.

The storage 170 includes a storage medium 171 that stores programs and data for controlling the operation of the display apparatus 100. In addition, the storage 170 may include a management circuit including a processor and/or a memory for managing data stored in the storage medium 171.

For example, the storage medium 171 may store an operation system (OS) that manages resources (e.g., software and/or hardware of the display apparatus 100) included in the display apparatus 100, a video player for decoding video data/audio data and reconstructing an image, a management application for managing the display apparatus 100, and the like.

The storage medium 171 may store video data/audio data displayed by the display apparatus 100. For example, the storage medium 171 may store an image file acquired by compressing/encoding video data/audio data.

The storage medium 171 may include a nonvolatile memory to retain stored programs and data even when power is cut off. For example, the storage medium 171 may include a flash memory, a solid state drive (SSD), a magnetic disk drive (a hard disc drive), or an optical disc drive.

The controller 180 may include a processor 181 for processing video/audio data, and a memory 182 for memorizing/storing programs and data for processing video/audio data. Further, the controller 180 may include hardware, such as the processor 181 and the memory 182, as well as software, such as an operating system (OS), a video player, and an audio player.

The memory 182 may store programs and data for processing video/audio data, and may temporarily store temporary data generated while the video/audio data is being processed.

The memory 182 may include non-volatile memories for storing data for a long period of time, such as Read Only Memory (ROM) and flash memory, and volatile memories for temporarily storing data, such as a Static Random Access Memory (S-RAM), a dynamic random access memory (D-RAM), and the like.

The memory 182 may include one memory chip including a plurality of memory cores, or may include a plurality of memory chips.

The processor 181 may decode video/audio data received through the content interface 120 and/or the communication interface 160 to reconstruct a plurality of images and audio signals from the video/audio data. The plurality of images may be displayed on the display 150. Sound according to the audio signal may be output through the speaker 140. The processor 181 may transmit the audio signal to the audio apparatus 200 through the content interface 120 and/or the communication interface 160 so that sound according to the audio signal is output through the audio apparatus 200.

The processor 181 may include one processor chip including a plurality of cores, or may include a plurality of processor chips. For example, the processor 181 may include an image processor that processes video/audio data, a micro controller that processes a users touch input and controls an operation of the display apparatus 100, and the like. In addition, the processor 181 may be provided separately from the memory 182 or may be provided integrally with the memory 182.

With regard to power, the display apparatus 100 may be set into three states, and the processor 181 may perform different operations depending on the power state of the display apparatus 100.

The display apparatus 100 may be set into an "off state" in which a plug of the display apparatus 100 is not inserted into a power socket. In the "off state", no power is supplied to the display apparatus 100, and the processor 181 may not perform any operation.

The display apparatus 100 may be set into a "standby state" in which a plug of the display apparatus 100 is inserted into a power socket and a power supply command (or an operation command) from a user is not input.

In the "standby state", power may be supplied to some of the components included in the display apparatus 100. In other words, some components of the display apparatus 100 may be activated in the "standby state". For example, in the "standby state", power may not be supplied to the display 150 and the speaker 140.

On the other hand, in the "standby state", power may be supplied to the user inputter 110 to receive a power supply command from the user. In the "standby state", power may be supplied to the content interface 120 and/or the communication interface 160 to receive video/audio data.

Power may be supplied to parts of the processor 181 to process user input and/or video/audio data. For example, power may not be supplied to an image processor that processes video/audio data, but may be supplied to a microcomputer that generates a control signal for controlling the display apparatus 100. As another example, power may not be supplied to a part of the processor 181 that processes video/audio data, but may be supplied to a part that generates a control signal for controlling the display apparatus 100.

In addition, the processor 181, in the standby state of the display apparatus 100, may receive operation information of the audio apparatus 200 from the audio apparatus 200 through the content interface 120 and/or the communication interface 160, and control the display 150 to display the received operation information of the audio apparatus 200. For example, in the "standby state", the microcomputer of the processor 180 may acquire operation information of the audio apparatus 200 and control the display 150 to display an image corresponding to the operation information of the audio apparatus 200. As another example, in the "standby state", some area of the processor 180 may acquire operation information of the audio apparatus 200 and control the display 150 to display an image corresponding to the operation information of the audio apparatus 200.

The display apparatus 100 may be set into an "on state" in which a plug of the display apparatus 100 is inserted into a power socket and a power supply command (or an operation command) of a user is input. In the "on state", power may be supplied to all of the components included in the display apparatus 100. In the "on state", power may be supplied not only to the user inputter 110 and the processor 181 but also to the display 150 and the speaker 140. In the "on state", the processor 181 may reconstruct a plurality of images from video data, and the display 150 may display the plurality of images.

The controller 180 including the processor 181 and the memory 182 may perform various operations to be described below.

Figure 5:
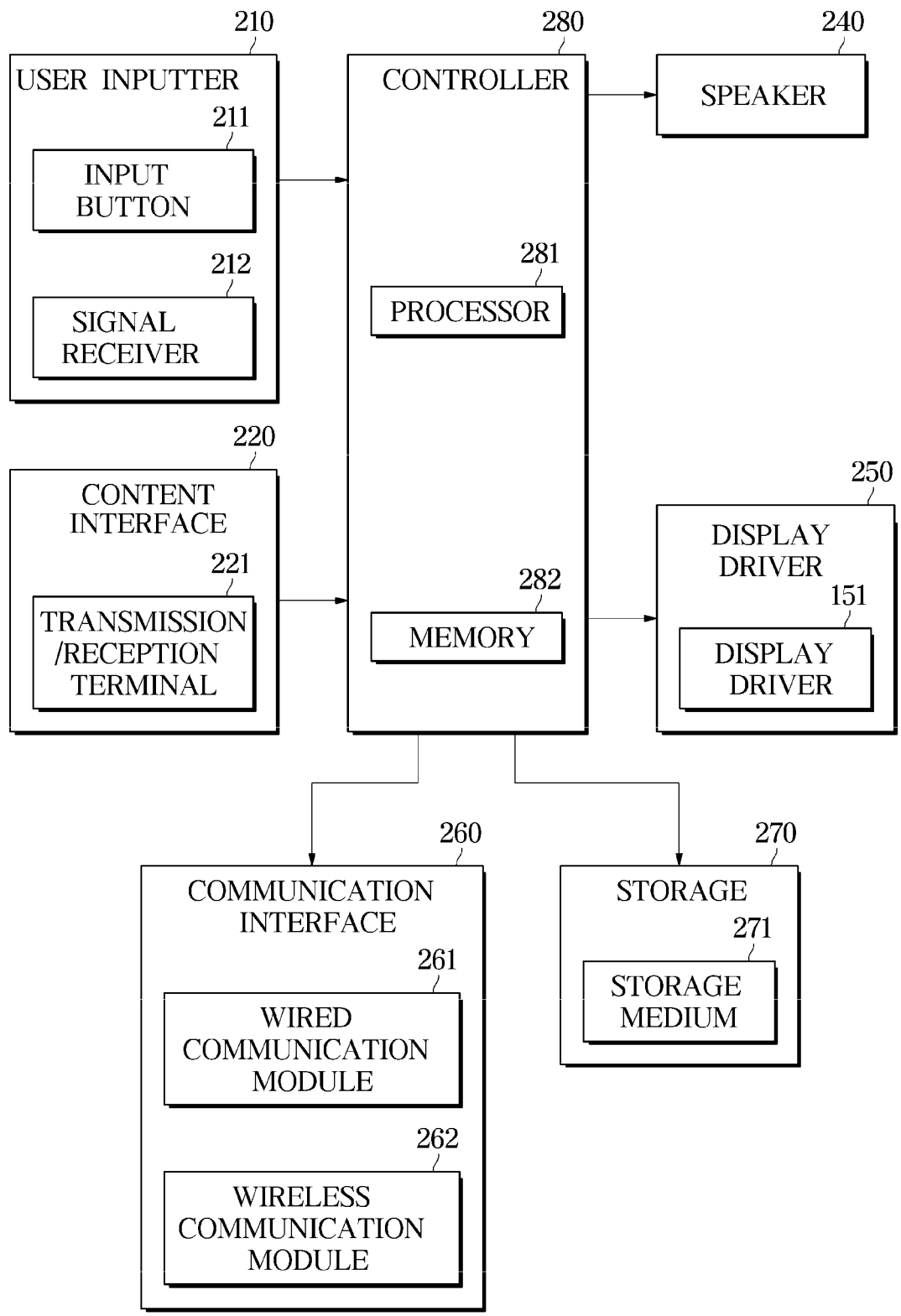
FIG. 5 illustrates a configuration of the audio apparatus according to the embodiment.

FIG. 5 illustrates a configuration of the audio apparatus according to the embodiment.

Referring to FIG. 5, the audio apparatus 200 includes a user inputter 210 to receive a user input from a user, a content interface 220 to receive audio data from content sources, a speaker 240 to output audio, a display 250 to display the operation of the audio apparatus 200, a communication interface 260 to transmit and receive data to and from external devices, a storage 270 to store programs and data for controlling the operation of the audio apparatus 200, and a controller 280 to process audio data and control the operation of the audio apparatus 200.

The user inputter 210 may receive a user input from a user and transmit an electrical signal corresponding to the user input to the controller 280. The user inputter 210 may include an input button 211 and a signal receiver 212, and may have the same configuration as that of the user inputter 110 of the display apparatus 100.

The content interface 220 may include a transmission/reception terminal 221. The transmission/reception terminal 221 may receive audio data from a content source or may transmit/receive audio data to and from a peripheral device (e.g., a display apparatus). The transmission/reception terminal 221 may include a HDMI terminal.

The speaker 240 may audibly output an audio signal.

The speaker 240 may include a plurality of speakers. For example, in order to output surround sound, the speaker 240 may include a left surround speaker disposed on the left side of the audio apparatus 200 and a right surround speaker disposed on the right side of the audio apparatus 200. In addition, the speaker 240 includes a tweeter capable of outputting high-frequency sound, a mid-range speaker capable of outputting intermediate frequency sound, and a woofer capable of outputting a low-frequency sound in order to output sound of various frequency bands.

In addition, the speaker 240 may include an audio amplifier that amplifies an audio signal to output sound of various intensities.

The display 250 includes a LED 251 that displays the operation of the audio apparatus 200. The audio apparatus 200 may omit a display panel for displaying an image to ensure a compact appearance.

The LED 251 may display the operation of the audio apparatus 200 using a color of light or blinking of light. For example, the LED 251 may display a "standby state" or an "on state" of the audio apparatus 200. In addition, the LED 251 may display a state in which a user input is waited or an operation in which the audio apparatus 200 reproduces music.

The communication interface 260 may exchange data with an external device, such as the display apparatus 100. The communication interface 260 may include a wired communication module 261 and a wireless communication module 262, and may be the same as the communication interface 160 of the display apparatus 100.

The storage 270 may store programs and data for controlling the audio apparatus 200. The storage 270 may include a storage medium 271 and may be the same as the storage 170 of the display apparatus 100.

The controller 280 may include a processor 281 for processing audio data and a memory 282 for memorizing/storing programs and data for processing audio data.

The memory 282 may store programs and data for processing audio data, and may be the same as the memory 182 of the display apparatus 100.

The processor 281 may process an audio signal through the content interface 220 and/or the communication interface 260. The audio signal processed by the processor 281 may be output through the speaker 240.

With regard to power, the audio apparatus 200 may be set into three states including an "off state", a "standby state" and an "on state", and depending on the power state of the audio apparatus 200, the processor 281 may perform different operations.

For example, in the "on state", the processor 281 may receive an audio signal from the display apparatus 100 through the content interface 220 and output sound according to the audio signal through the speaker 240.

In addition, in the "on state", the processor 281 may transmit operation information indicating detailed operations of the audio apparatus 200 to the display apparatus 100 through the content interface 220 and/or the communication interface 260. The audio apparatus 200 includes the LED 251 that displays the operation of the audio apparatus 200, but the LED 251 has a limitation in displaying detailed information of the audio apparatus 200. Accordingly, the processor 281 may transmit operation information of the audio apparatus 200 to the display apparatus 100 such that detailed information of the audio apparatus 200 is displayed on the display apparatus 100.

The controller 280 including the processor 281 and the memory 282 may perform various operations to be described below.

Figure 6:
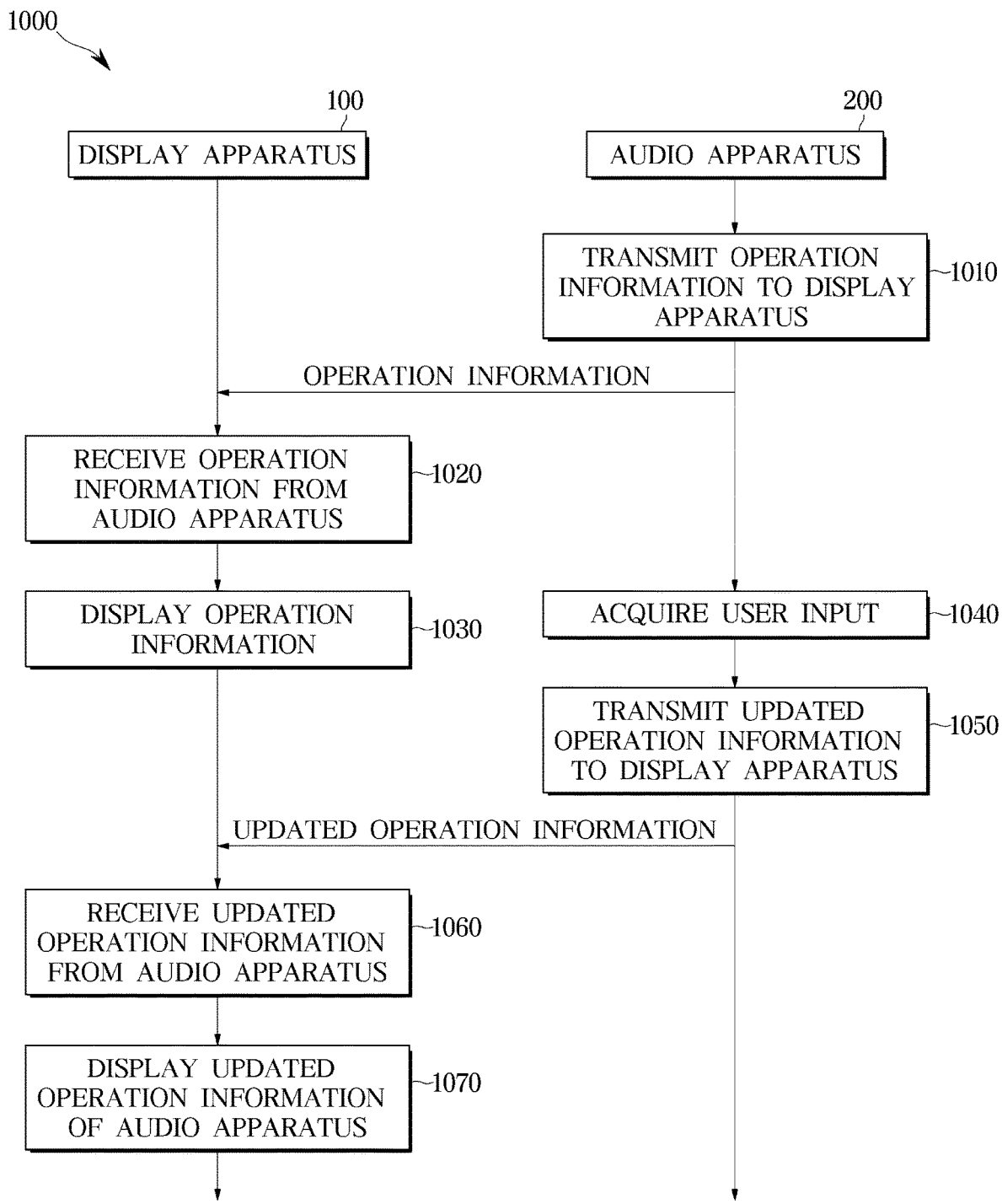
FIG. 6 illustrates operations of the display apparatus and the audio apparatus according to an embodiment.
Figure 7:
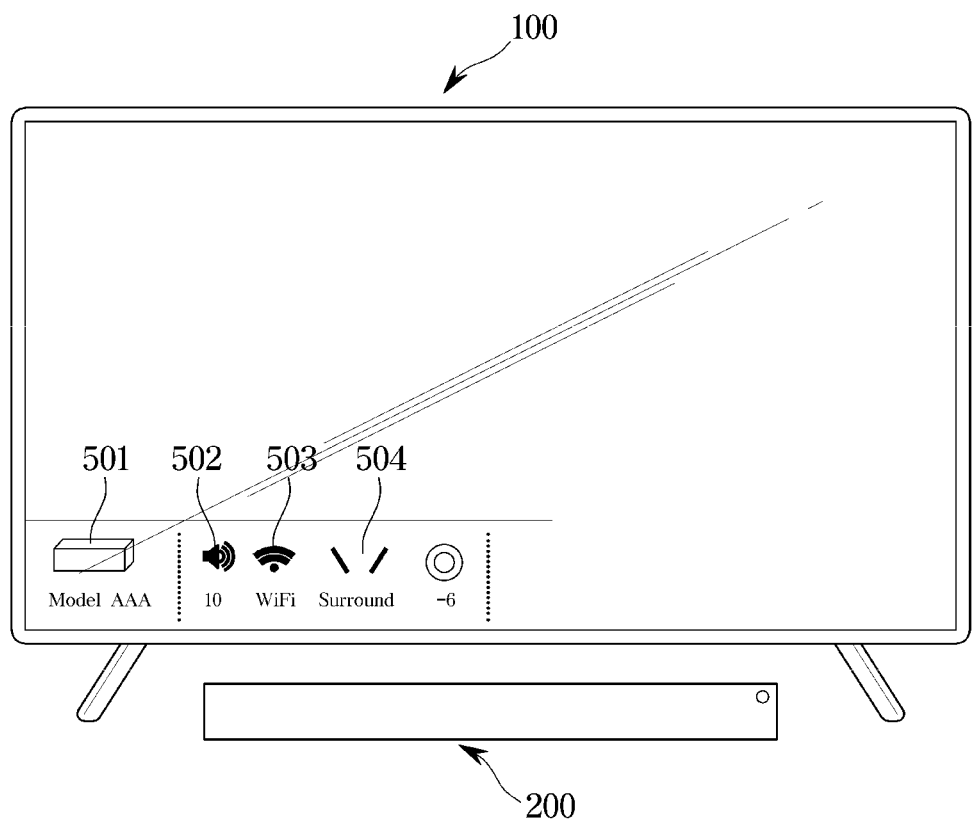
FIG. 7 illustrates an image displayed on the display apparatus according to the operation shown in FIG. 6.

FIG. 6 illustrates operations of the display apparatus and the audio apparatus according to an embodiment. FIG. 7 illustrates an image displayed on the display apparatus according to the operation shown in FIG. 6.

Referring to FIGS. 6 and 7, an operation (1000) of the display apparatus 100 and the audio apparatus 200 will be described.

The display apparatus 100 may be connected to the audio apparatus 200 through the content interface 120 and/or the communication interface 260, and the audio apparatus 200 may also be connected to the display apparatus 100 through the content interface 220 and/or the communication interface 260. In addition, the display apparatus 100 may be set into an "on state" or a "standby state". The audio apparatus 200 may also be set into an "on state" or a "standby state".

The audio apparatus 200 transmits operation information to the display apparatus 100 (1010).

In the "on state" or the "standby state", the controller 280 of the audio apparatus 200 may collect operation information of components included in the audio apparatus 200. For example, the controller 280 may collect identification information of the audio apparatus 200 (e.g., a model name of the audio apparatus), the volume of the speaker 240, a connection method with the display apparatus 100, a sound output mode (e.g., a surround mode or a mono mode) of the speaker 240, and the like.

In the "on state", the content interface 220, the communication interface 260, and the controller 280 of the audio apparatus 200 may be activated. Further, in the "standby state", the content interface 220 and/or the communication interface 260 may be activated, and the controller 280 may be partially activated.

The controller 280 may transmit the collected operation information of the audio apparatus 200 to the display apparatus 100 through the content interface 220 and/or the communication interface 260.

The display apparatus 100 receives the operation information of the audio apparatus 200 (1020).

In the "on state" or "standby state", the controller 180 of the display apparatus 100 may acquire the operation information of the audio apparatus 200 through the content interface 120 and/or the communication interface 160. In the "on state", the content interface 120, the communication interface 160, and the controller 180 of the display apparatus 100 may be activated. Further, in the "standby state", the content interface 120 and/or the communication interface 160 may be activated, and the controller 180 may also be partially activated.

The display apparatus 100 displays the operation information of the audio apparatus 200 (1030).

The controller 180 of the display apparatus 100 may control the display 150 to display the operation information of the audio apparatus 200. For example, the microcomputer of the processors 181 may control the display 150 to display an image corresponding to the operation information of the audio apparatus 200.

The controller 180 may control the display 150 to display the operation information of the audio apparatus 200 on a portion of the display panel 152.

The controller 180 may control the display 150 to display the operation information of the audio apparatus 200 on a lower portion of the display panel 152 as shown in FIG. 7.

By displaying the operation information of the audio apparatus 200 on the lower portion of the display panel 152 in the "on state" of the display apparatus 100, the display apparatus 100 may prevent display of content on the display panel 152 from being interrupted.

In addition, in the "standby state" of the display apparatus 100, the display apparatus 100 may control the display 150 to display an image having a bright color, such as white, on a background screen of a black in which light is not output, to thereby minimize the amount of power consumed by the display panel 152. For example, the controller 180 may control the display 150 to emit light only from a lower portion of the backlight unit 152*b* while passing light through a lower portion of the liquid crystal panel 152*a*. As another example, the controller 180 may control the display 150 to emit light only at a lower portion of the LED panel 152*c*.

Referring to FIG. 7, the controller 180 may control the display 150 to display an image object 501 representing identification information of the audio apparatus 200, an image object 502 representing the volume of the speaker 240 of the audio apparatus 200, an image object 503 representing a connection method with the audio apparatus 200, an image object 504 representing a sound output mode of the speaker 240, and the like.

The audio apparatus 200 acquires a user input (1040).

While the display apparatus 100 is displaying the operation information of the audio apparatus 200, a user may input a user input through the user inputter 210 of the audio apparatus 200. For example, the user may input a user input for reproducing audio, increasing the volume of the speaker 240, or changing the sound output mode of the speaker 240 through the input button 211 of the audio apparatus 200.

The controller 280 of the audio apparatus 200 may acquire the user input from the user inputter 210 and may control the audio apparatus 200 in response to the user input. For example, the controller 280 may reproduce audio, increase the volume of the speaker 240, or change the sound output mode of the speaker 240.

The audio apparatus 200 transmits the updated operation information to the display apparatus 100 (1050).

The controller 280 of the audio apparatus 200 may collect operation information updated after a user input, and may transmit the updated operation information of the audio apparatus 200 to the display apparatus 100 through the content interface 220 and/or the communication interface 260. For example, the controller 280 may transmit operation information, which has been changed from reproducing audio, increasing the volume of the speaker 240, or changing the sound output mode of the speaker 240, to the display apparatus 100.

The display apparatus 100 receives the updated operation information of the audio apparatus 200 (1060), and displays the updated operation information by the audio apparatus 200 (1070).

The controller 180 of the display apparatus 100 may receive the updated operation information of the audio apparatus 200 through the content interface 120 and/or the communication interface 160. In addition, the controller 180 may control the display 150 to display the operation information changed from the reproducing of audio, increasing of the volume of the speaker 240, or changing of the sound output mode of the speaker 240.

As described above, the display apparatus 100 may receive operation information of the audio apparatus 200 and display the operation information of the audio apparatus 200. Accordingly, the display apparatus 100 may provide a user with detailed information about the audio apparatus 200 that does not include a display panel. Even when the audio apparatus 200 includes a display panel, the display apparatus 100 may allow detailed information about the audio apparatus 200 to be displayed on the display panel 152 with a high visibility. In addition, the user may easily acquire information about the audio apparatus 200 through the display apparatus 100.

Figure 8:
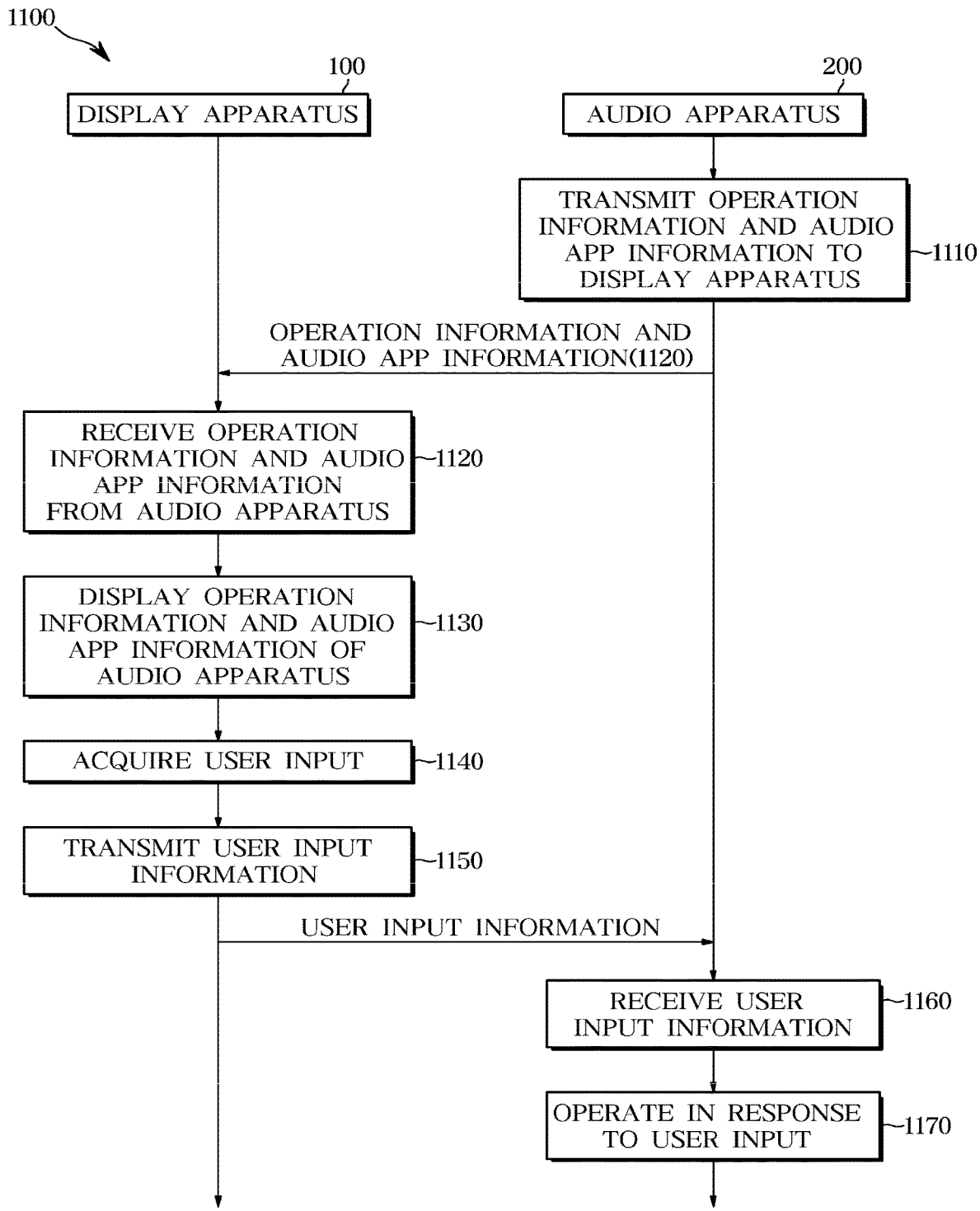
FIG. 8 illustrates operations of the display apparatus and the audio apparatus according to an embodiment.
Figure 9:
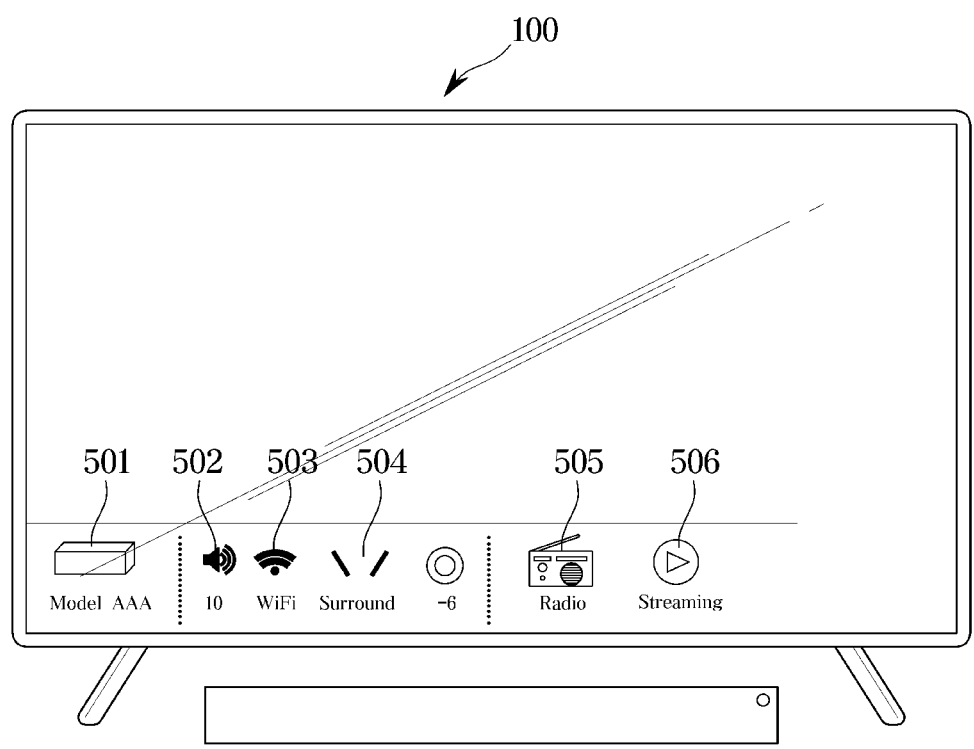
FIG. 9 illustrates an image displayed on the display apparatus according to the operation shown in FIG. 8.

FIG. 8 illustrates operations of the display apparatus and the audio apparatus according to an embodiment. FIG. 9 illustrates an image displayed on the display apparatus according to the operation shown in FIG. 8.

Referring to FIGS. 8 and 9, an operation (1100) of the display apparatus 100 and the audio apparatus 200 will be described.

The display apparatus 100 may be connected to the audio apparatus 200 and may be set into an "on state" or a "standby state". In addition, the audio apparatus 200 may be set into an "on state".

The audio apparatus 200 transmits operation information and information about an application related to audio reproduction (hereinafter, referred to as 'audio application information') to the display apparatus 100 (1110).

The controller 280 of the audio apparatus 200 may collect operation information about the audio apparatus 200 including identification information of the audio apparatus 200, a volume of the speaker 240, a connection method with the display apparatus 100, and a sound output mode of the speaker 240.

In addition, the controller 280 may collect information about an application related to audio reproduction that is stored in the storage 270. The storage 270 may store a radio broadcast application that reproduces public radio broadcasts, an internet radio application that plays Internet audio streaming (internet music broadcast), and an audio player that reproduces audio files stored in the storage 270 or an external storage, and the like.

The controller 280 may transmit the operation information and the audio application information of the audio apparatus 200 to the display apparatus 100 through the content interface 220 and/or the communication interface 260.

The display apparatus 100 receives the operation information and the audio application information of the audio apparatus 200 (1120).

The controller 180 of the display apparatus 100 may acquire the operation information and the audio application information of the audio apparatus 200 through the content interface 120 and/or the communication interface 160.

Operation 1120 may be similar to operation 1020 illustrated in FIG. 6.

The display apparatus 100 displays the operation information and the audio application information of the audio apparatus 200 (1130).

The controller 180 of the display apparatus 100 may control the display 150 to display the operation information and the audio application information of the audio apparatus 200 on a portion of the display panel 152. For example, as shown in FIG. 9, the controller 180 may display image objects 501, 502, 503, and 504 representing operation information of the audio apparatus 200, an image object 505 representing a radio application stored in the audio apparatus 200, an image object 506 representing an audio streaming application stored in the audio apparatus 200, and a playlist of an audio player stored in the audio apparatus 200, on a lower portion of the display panel 152.

While the display apparatus 100 is displaying the operation information and the audio application information of the audio apparatus 200, the display apparatus 100 acquires a user input for the audio apparatus 200 (1140).

A user may input a user input for the audio apparatus 200 through the user inputter 110 of the display apparatus 100. A user may input a user input for reproducing audio of the audio apparatus 200, increasing the volume of the speaker 240, or changing the sound output mode of the speaker 240 through the remote control 112a of the display apparatus 100. In addition, a user may input a user input for executing a radio application or an audio streaming application of the audio apparatus 200 through the remote control 112a of the display apparatus 100.

The user may select the image object 502 representing the sound volume of the audio apparatus 200 and adjust the sound volume of the audio apparatus 200 using the remote control 112a. In addition, the user may execute the radio application of the audio apparatus 200 using the remote control 112a. In other words, the image objects 501, 502, 503, 504, 505, and 506 displayed on the display 150 may serve as a control menu for acquiring a user input. The display apparatus 100 may acquire a user input through the image objects (or the control menus) 501, 502, 503, 504, 505, and 506 displayed on the display 150 and the remote control 112a.

The controller 180 of the display apparatus 100 may acquire a user input for the audio apparatus 200 through the user inputter 110.

The display apparatus 100 transmits information about the user input (hereinafter, referred to as 'user input information') to the audio apparatus 200 (1150).

The controller 180 of the display apparatus 100 may transmit the user input information to the audio apparatus 200 through the content interface 120 and/or the communication interface 160 in response to the user input for the audio apparatus 200.

The audio apparatus 200 receives the user input information from the display apparatus 100 (1160).

The controller 280 of the audio apparatus 200 may receive the user input information from the display apparatus 100 through the content interface 220 and/or the communication interface 260.

The audio apparatus 200 operates in response to the user input inputted to the display apparatus 100 (1170).

The controller 280 of the audio apparatus 200 may receive the user input information, and acquire the user input on the basis of the user input information.

The controller 280 may control the audio apparatus 200 in response to the user input inputted through the display apparatus 100. For example, the controller 280 may reproduce audio, increase the volume of the speaker 240, or change the sound output mode of the speaker 240. Alternatively, the controller 280 may execute a radio application stored in the storage 270 or an audio streaming app.

As described above, the display apparatus 100 may display audio application information of the audio apparatus 200 and acquire a user input from a user. Accordingly, the display apparatus 100 may allow a user to control the audio apparatus 200 through the user inputter 110 of the display apparatus 100. The display apparatus 100 may display various images through the display 150, so that a user may check various settings and commands that may be imputable to the audio apparatus 200 through the display 150. In addition, the user may control the audio apparatus 200 using the remote control 112a of the display apparatus 100 at a remote site.

Figure 10:
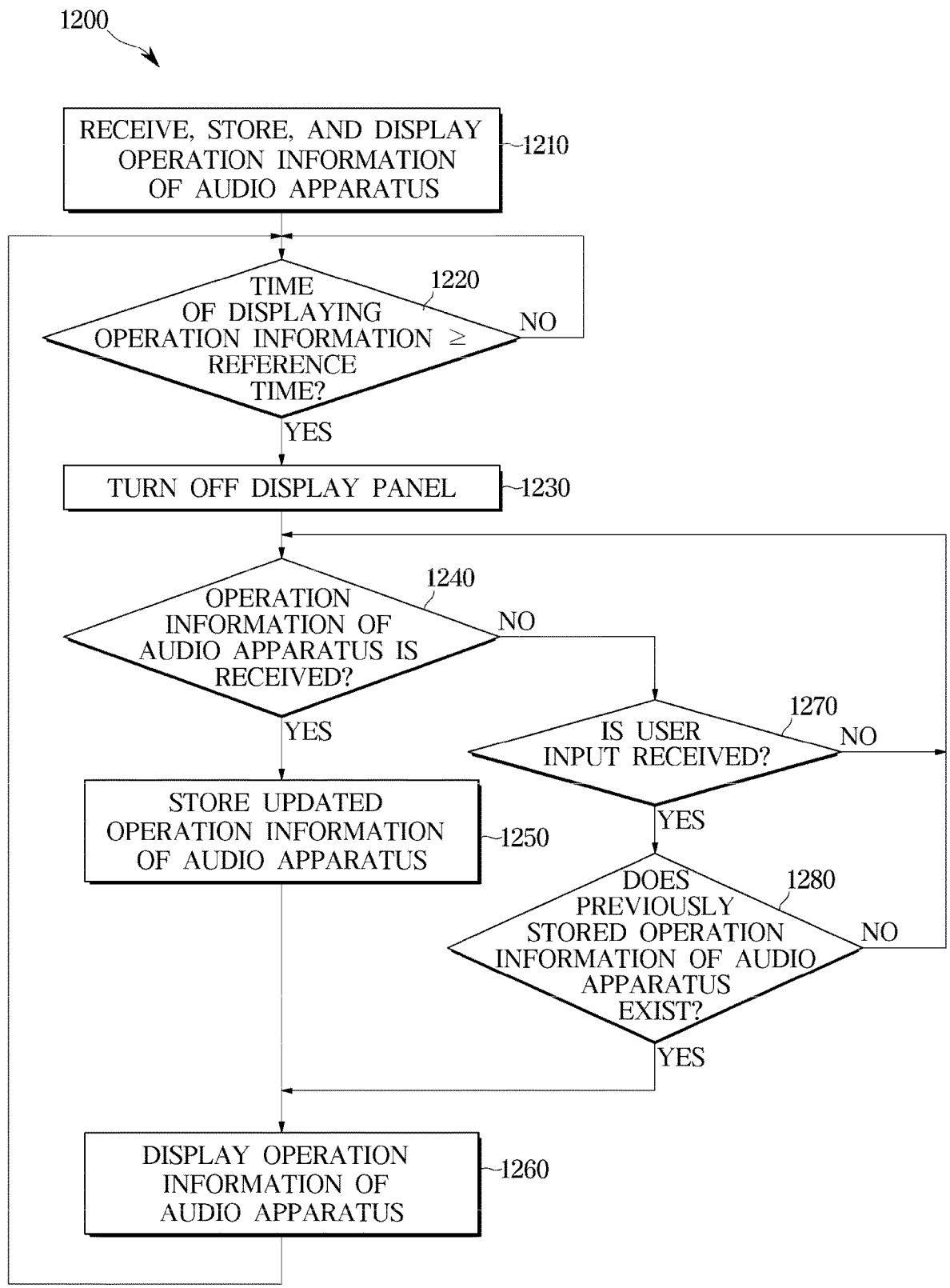
FIG. 10 illustrates an operation of the display apparatus according to an embodiment.

FIG. 10 illustrates an operation of the display apparatus according to an embodiment.

Referring to FIG. 10, an operation (1200) of the display apparatus 100 will be described.

The display apparatus 100 may be connected to the audio apparatus 200 and may be set into an "on state" or a "standby state".

The display apparatus 100 receives, stores, and displays operation information of the audio apparatus 200 (1210).

The display apparatus 100 may receive the operation information of the audio apparatus 200 through the content interface 120 and/or the communication interface 160, and may also store the operation information of the audio apparatus 200. The controller 180 of the display apparatus 100 may control the storage 170 to store the operation information of the audio apparatus 200.

In addition, in the "standby state" of the display apparatus 100, the controller 180 may control the display 150 to display the operation information of the audio apparatus 200. Specifically, the controller 180 may control the display 150 to display the operation information on a portion of the display panel 152.

The display apparatus 100 determines whether the time of displaying the operation information of the audio apparatus 200 is greater than or equal to a reference time (1220).

The controller 180 may operate a timer in response to the operation information being displayed on the portion of the display panel 152, and count the time of displaying the operation information of the audio apparatus 200 on the portion of the display panel 152.

The controller 180 may compare the time of displaying the operation information of the audio apparatus 200 on the portion of the display panel 152 with a reference time. The reference time may be set experimentally or empirically.

Based on the comparison of the time for which the operation of the audio apparatus 200 is displayed with the reference time, the controller 180 may determine whether the time of displaying the operation information of the audio apparatus 200 is greater than or equal to the reference time.

In response to the time of displaying the operation information of the audio apparatus 200 being less than the reference time (No in operation 1220), the display apparatus 100 continues to display the operation information of the audio apparatus 200.

In response to the time of displaying the operation information of the audio apparatus 200 being greater than or equal to the reference time (YES in operation 1220), the display apparatus 100 may turn off the display panel 152 (1230)

In order to reduce the amount of power consumed for displaying the operation information of the audio apparatus 200, the controller 180, in response to the display time of the operation information of the audio apparatus 200 being greater than or equal to the reference time, may turn off the display panel 152.

After the display panel 152 is turned off, the display apparatus 100 determines whether operation information of the audio apparatus 200 has been received (1240).

The audio apparatus 200, in response to the operation thereof being changed according to a user input, may update the operation information based on the changed operation, and transmit the updated operation information. Specifically, the audio apparatus 200 may transmit updated operation information whenever the operation information is updated.

The controller 180 of the display apparatus 100 may determine whether updated operation information has been received from the audio apparatus 200.

In response to operation information of the audio apparatus 200 being received (YES in operation 1240), the display apparatus 100 stores the operation information of the audio apparatus 200 (1250).

In response to operation information of the audio apparatus 200 being received, it is determined that the operation of the audio apparatus 200 has been changed.

The controller 180 may store new operation information of the audio apparatus 200 or updated operation information of the audio apparatus 200 in the storage 170.

Thereafter, the display apparatus 100 displays the operation information of the audio apparatus 200 (1260).

The controller 180 may control the display 150 to display the updated operation information of the audio apparatus 200 on a portion of the display panel 152.

Thereafter, the display apparatus 100 may determine again whether the time of displaying the operation information of the display apparatus 100 is greater than or equal to the reference time.

In response to no operation information of the audio apparatus 200 being received (No in operation 1240), the display apparatus 100 determines whether a user input has been acquired (1270).

The controller 180 may determine whether a user input has been input through the user inputter 110 in an off-state of the display panel 152. In other words, the controller 180 may determine whether a user has input a new user input after the display panel 152 is turned off.

In response to no user input being acquired (No in operation 1270), the display apparatus 100 may determine again whether operation information of the audio apparatus 200 has been received.

In response to a user input being acquired (YES in operation 1270), the display apparatus 100 determines whether previously stored operation information of the audio apparatus 200 exists in the storage 170 (1280).

The controller 180 may determine whether operation information of the audio apparatus 200 to be displayed on the display panel 152 is stored in the storage 170 before the acquisition of the user input. In other words, the controller 180 may determine whether operation information of the audio apparatus 200 is previously stored in the storage 170 to display the operation information of the audio apparatus 200 in response to the acquisition of the user input.

In response to previously stored operation information of the audio apparatus 200 not existing (No in operation 1280), the display apparatus 100 may determine again whether operation information of the audio apparatus 200 has been received.

In response to previously stored operation information of the audio apparatus 200 existing (YES in operation 1280), the display apparatus 100 displays the operation information of the audio apparatus 200 (1260).

Thereafter, the display apparatus 100 may determine again whether the time of displaying the operation information of the audio apparatus 200 on the display apparatus 100 is greater than or equal to the reference time.

As described above, the display apparatus 100 may display operation information of the audio apparatus 200 on a portion of the display panel 152, and may turn off the display panel 152 when the time of displaying the operation information of the audio apparatus 200 is greater than or equal to the reference time. Accordingly, the display apparatus 100 may reduce the amount of power consumed for displaying operation information of the audio apparatus 200 in the "standby state".

The display apparatus 100, in response to operation information of the audio apparatus 200 being updated during an off-state of the display panel 152, may display the updated operation information of the audio apparatus 200 on the display panel 152. Accordingly, the display apparatus 100 may immediately notify the user of a change in operation or setting of the audio apparatus 200.

The display apparatus 100 may, in response to a user input being input during an off-state of the display panel 152, display updated operation information of the audio apparatus 200 on the display panel 152. Accordingly, the display apparatus 100 may provide the user with operation information of the audio apparatus 200 whenever the user desires.

Figure 11:
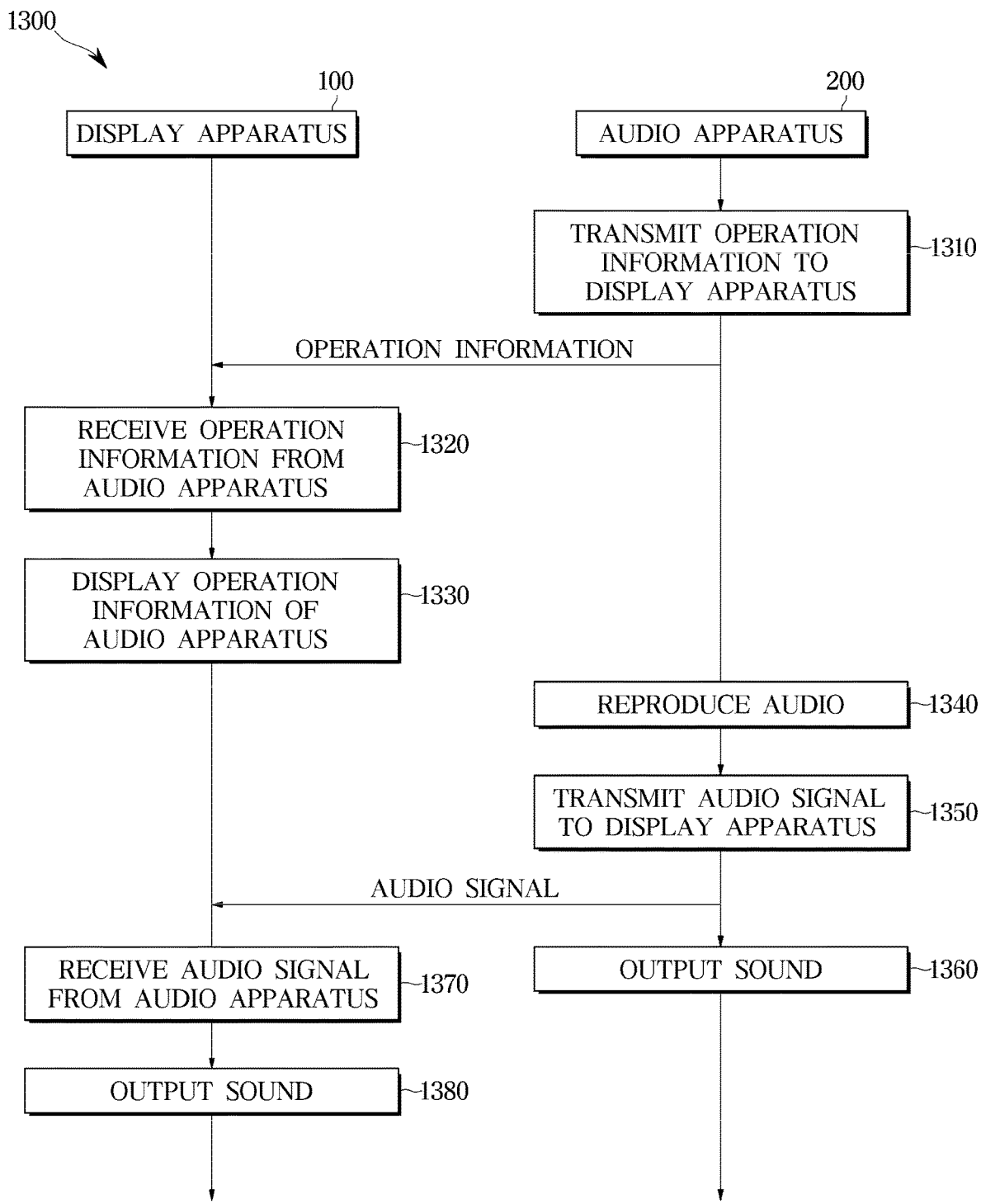
FIG. 11 illustrates operations of the display apparatus and the audio apparatus according to an embodiment.

FIG. 11 illustrates operations of the display apparatus and the audio apparatus according to an embodiment.

Referring to FIG. 11, an operation (1300) of the display apparatus 100 and the audio apparatus 200 will be described.

The display apparatus 100 may be connected to the audio apparatus 200 and may be set into an "on state" or a "standby state". In addition, the audio apparatus 200 may be set into an "on state".

The audio apparatus 200 transmits operation information to the display apparatus 100 (1310). The display apparatus 100 receives the operation information of the audio apparatus 200 (1320). The display apparatus 100 displays the operation information of the audio apparatus 200 (1330).

Operations 1310, 1320, and 1330 may be the same as operations 1010, 1020, and 1030 shown in FIG. 6.

The audio apparatus 200 reproduces audio (1340).

While the display apparatus 100 is displaying the operation information of the audio apparatus 200, the audio apparatus 200 may reproduce audio in response to a user input. For example, the user may input a user input (e.g., pressing a play button) for reproducing audio through the input button 211 of the audio apparatus 200. The controller 280 of the audio apparatus 200 may acquire a user input from the user inputter 210 and reproduce audio in response to the user input.

As another example, a user may input a user input for reproducing audio through the remote control 112a of the display apparatus 100. In response to the user input for the audio apparatus 200 being received, the controller 180 of the display apparatus 100 may transmit user input information to the audio apparatus 200. The audio apparatus 200 may reproduce audio in response to the user input received from the display apparatus 100.

The audio apparatus 200 transmits an audio signal based on the reproduction of the audio to the display apparatus 100 (1350). The audio apparatus 200 outputs sound according to the audio signal (1360).

The controller 280 of the audio apparatus 200 may reconstruct an audio signal from an audio file or a radio broadcast signal, and transmit the audio signal to the display apparatus 100 through the content interface 220 and/or the communication interface 260.

Further, the controller 280 of the audio apparatus 200 may control the speaker 240 to convert the audio signal into sound and output the sound according to the audio signal.

The audio signal transmitted from the audio apparatus 200 to the display apparatus 100 may be the same as or corresponding to the audio signal output from the audio apparatus 200.

The display apparatus 100 receives the audio signal from the audio apparatus 200 (1370).

The controller 180 of the display apparatus 100 may receive the audio signal through the content interface 120 and/or the communication interface 160.

The display apparatus 100 outputs sound according to the audio signal (1380).

The controller 180 of the display apparatus 100 may control the speaker 140 to convert the audio signal into sound and output the sound according to the audio signal. The sound output from the display apparatus 100 may be the same as or correspond to the sound output from the audio apparatus 200. For example, the display apparatus 100 may output sound for assisting the output of the sound of the audio apparatus 200. In addition, the display apparatus 100 may output sound for enhancing a surround effect of the sound output from the audio apparatus 200.

As described above, the display apparatus 100 may receive an audio signal from the audio apparatus 200 and output sound according to the audio signal together with the audio apparatus 200. In other words, the display apparatus 100 may assist the audio apparatus 200. As the display apparatus 100 outputs sound that is the same as or corresponds to the sound of the audio apparatus 200, the display apparatus 100 and the audio apparatus 200 may provide a user with richer sound compared to sound output only by the audio apparatus 200.

Figure 12:
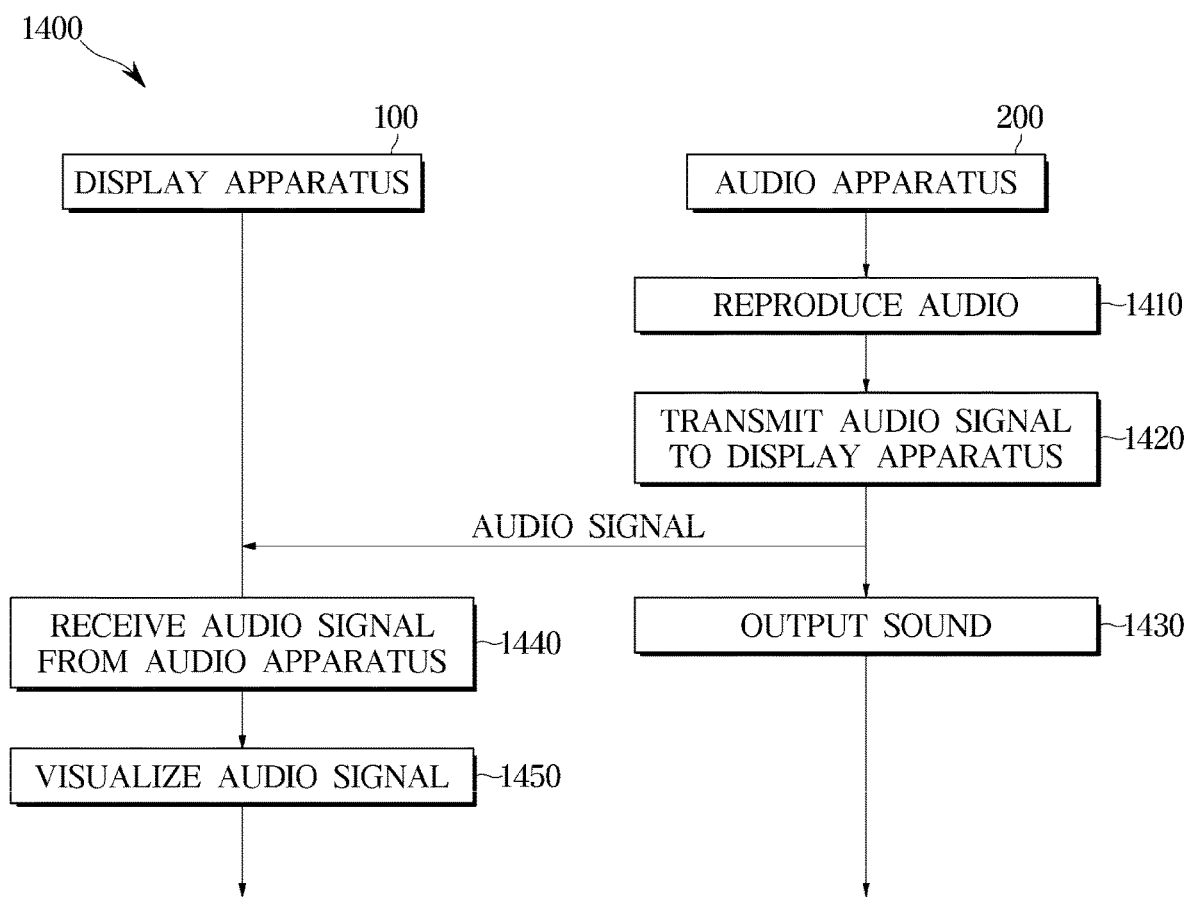
FIG. 12 illustrates operations of the display apparatus and the audio apparatus according to an embodiment.
Figure 13:
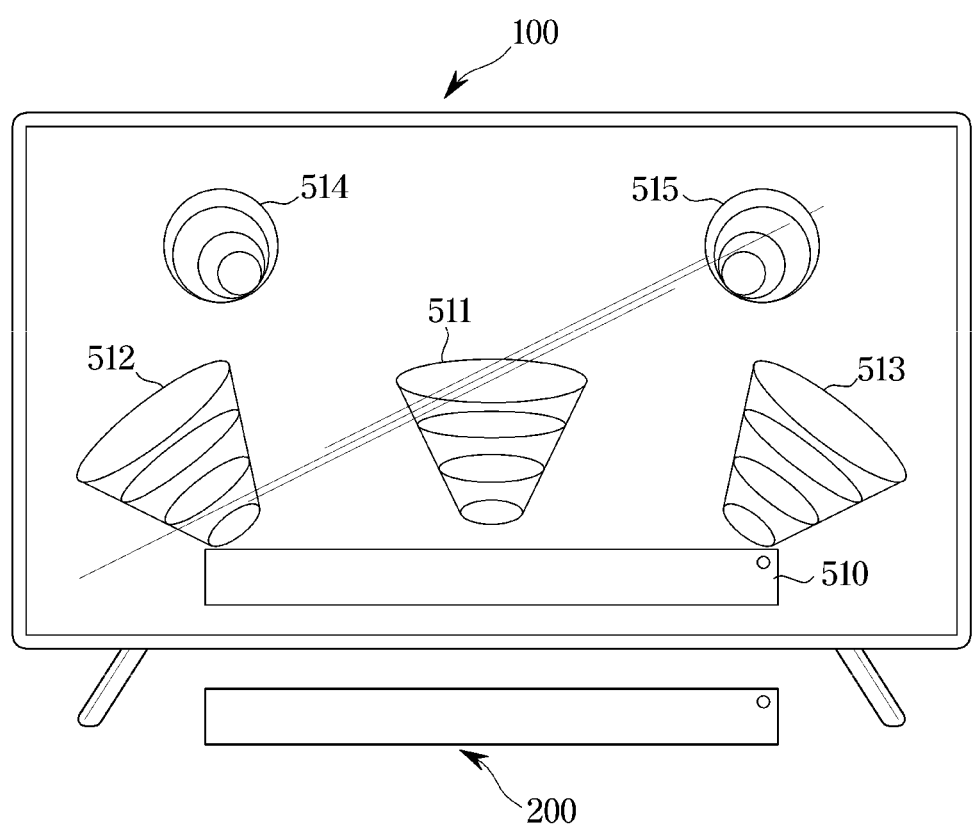
FIG. 13 illustrates an image displayed on the display apparatus according to the operation shown in FIG. 12.

FIG. 12 illustrates operations of the display apparatus and the audio apparatus according to an embodiment. FIG. 13 illustrates an image displayed on the display apparatus according to the operation shown in FIG. 12.

Referring to FIGS. 12 and 13, an operation (1400) of the display apparatus 100 and the audio apparatus 200 will be described.

The display apparatus 100 may be connected to the audio apparatus 200 and may be set into an "on state" or a "standby state". In addition, the audio apparatus 200 may be set into an "on state".

The audio apparatus 200 reproduces audio (1410). The audio apparatus 200 transmits an audio signal based on the reproduction of the audio to the display apparatus 100 (1420). The audio apparatus 200 outputs sound according to the audio signal (1430).

Operations 1410, 1420, and 1430 may be the same as operations 1350, 1360, and 1370 shown in FIG. 11.

The display apparatus 100 receives the audio signal from the audio apparatus 200 (1440).

The controller 180 of the display apparatus 100 may receive the audio signal through the content interface 120 and/or the communication interface 160.

The display apparatus 100 visualizes the audio signal received from the audio apparatus 200 (1450).

The controller 180 of the display apparatus 100 may execute a display application (hereinafter, referred to as a "sound visualization application") for visualize an audio signal or sound in response to a user input. For example, a display application for visualizing an audio signal or a sound may be stored in the storage 170. In the "on state" of the display apparatus 100, the controller 180 may control the display 150 to display a plurality of display applications that may be executable, and in response to a users selection by the remote control 112a, may execute the sound visualization application.

When the sound visualization application is executed, the controller 180 may control the display 150 to display a shape, letter, number, or symbol corresponding to the audio signal or sound. For example, the controller 180 may visualize a waveform of sound, a frequency of sound, intensities of sound for each frequency, a rhythm, a melody, and harmony.

The controller 180 may visualize a position at which the audio apparatus 200 outputs sound and an intensity of the output sound. As shown in FIG. 13, the controller 180 may control the display 150 to display an image 510 (e.g., a photographed picture of the audio apparatus) representing the audio apparatus 200.

The controller 180 may display an image representing sound output from the audio apparatus 200 depending on the audio signal received from the audio apparatus 200. As shown in FIG. 13, the controller 180 may, depending on the audio signal, control the display 150 to display a first image 511 representing sound output from a center speaker (e.g., a woofer) of the audio apparatus 200, a second image 512 representing sound output from a left speaker of the audio apparatus 200, and a third image 513 representing sound output from a right speaker of the audio apparatus 200.

The controller 180 may control the speaker 140 to output sound according to the audio signal received from the audio apparatus 200. In addition, the controller 180 may display an image representing sound output from the speaker 140 depending on the audio signal received from the audio apparatus 200. As shown in FIG. 13, the controller 180 may control the display 150 to display a fourth image 514 representing sound output from a left speaker and a fifth image 515 representing sound output from a right speaker, depending on the audio signal.

As described above, the display apparatus 100 may display an image representing sound output of the audio apparatus 200. Accordingly, the display apparatus 100 may provide a user with information about a location and/or direction in which sound is output from the audio apparatus 200.

Figure 14:
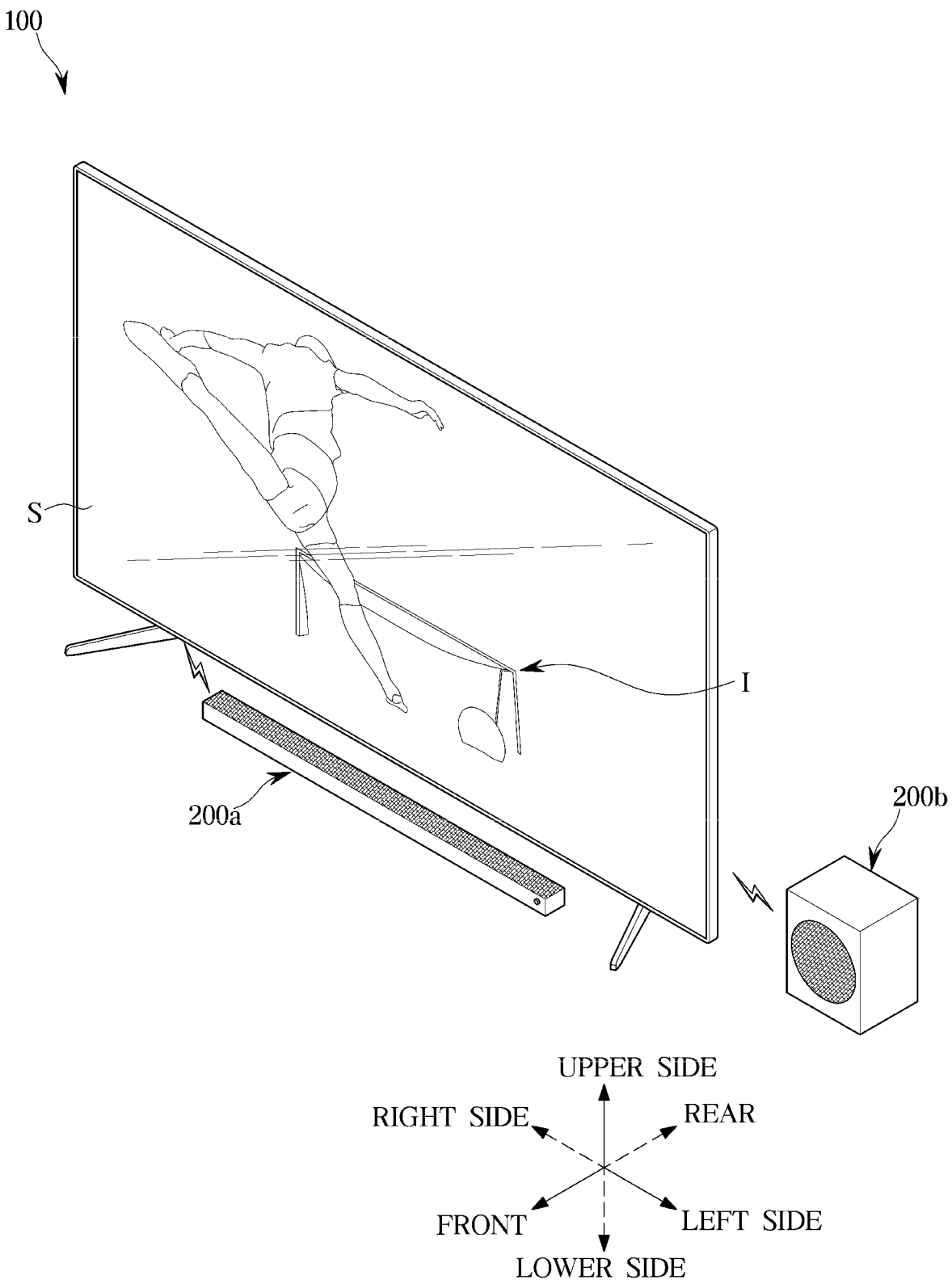
FIG. 14 illustrates a display apparatus and a plurality of audio apparatuses connected to the display apparatus according to an embodiment.

FIG. 14 illustrates a display apparatus and a plurality of audio apparatuses connected to the display apparatus according to an embodiment.

Referring to FIG. 14, a display apparatus 100 may be connected to a first audio apparatus 200a and a second audio apparatus 200b in a wired and/or wireless manner. The display apparatus 100 may be the same as the display apparatus shown in FIGS. 1, 2, 3, and 4, and the first and second audio apparatuses 200a and 200b may each be the same as that shown in FIGS. 1 and 5.

The display apparatus 100 may be connected to the first and second audio apparatuses 200a and 200b through the content interface 120 and/or the communication interface 160. The display apparatus 100 may be connected to the first and second audio apparatuses 200a and 200b in a wired manner. For example, the display apparatus 100 may be connected to each of the first and second audio apparatuses 200a and 200b through a HDMI terminal.

The display apparatus 100 may be wirelessly connected to each of the first and second audio apparatuses 200a and 200b. The display apparatus 100 may be connected to each of the first and second audio apparatuses 200a and 200b using the same wireless communication. For example, the display apparatus 100 may be independently connected to each of the first audio apparatus 200a and the second audio apparatus 200b using Bluetooth wireless communication.

In addition, the display apparatus 100 may be connected to each of the first and second audio apparatuses 200a and 200b using a different wireless communication. For example, the display apparatus 100 may be connected to the first audio apparatus 200a using Wi-Fi wireless communication, and may be connected to the second audio apparatus 200b using Bluetooth wireless communication.

The display apparatus 100 may be connected to the first audio apparatus 200a in a wired manner, and may be connected to the second audio apparatus 200b through the wireless communication module 162 in a wireless manner. For example, the display apparatus 100 may be connected to the first audio apparatus 200a through a HDMI terminal, and may be connected to the second audio apparatus 200b through Bluetooth wireless communication.

The display apparatus 100 may output sound through the first and second audio apparatuses 200a and 200b. For example, the display apparatus 100 may transmit an audio signal to each of the first and second audio apparatuses 200a and 200b through the content interface 120 and/or the communication interface 160, and each of the first and second audio apparatuses 200a and 200b may output sound according to the audio signal.

The display apparatus 100 transmits the same audio signal to the first and second audio apparatuses 200a and 200b, or may transmit audio signals (a left audio signal and a right side audio signal, e.g., an intermediate frequency audio signal and a low frequency audio signal) corresponding respectively to the first and second audio apparatuses 200a and 200b.

As such, the display apparatus 100 outputs sound through the plurality of audio apparatuses 200a and 200b, so that the display apparatus 100 may provide a user with a richer sound.

Figure 15:
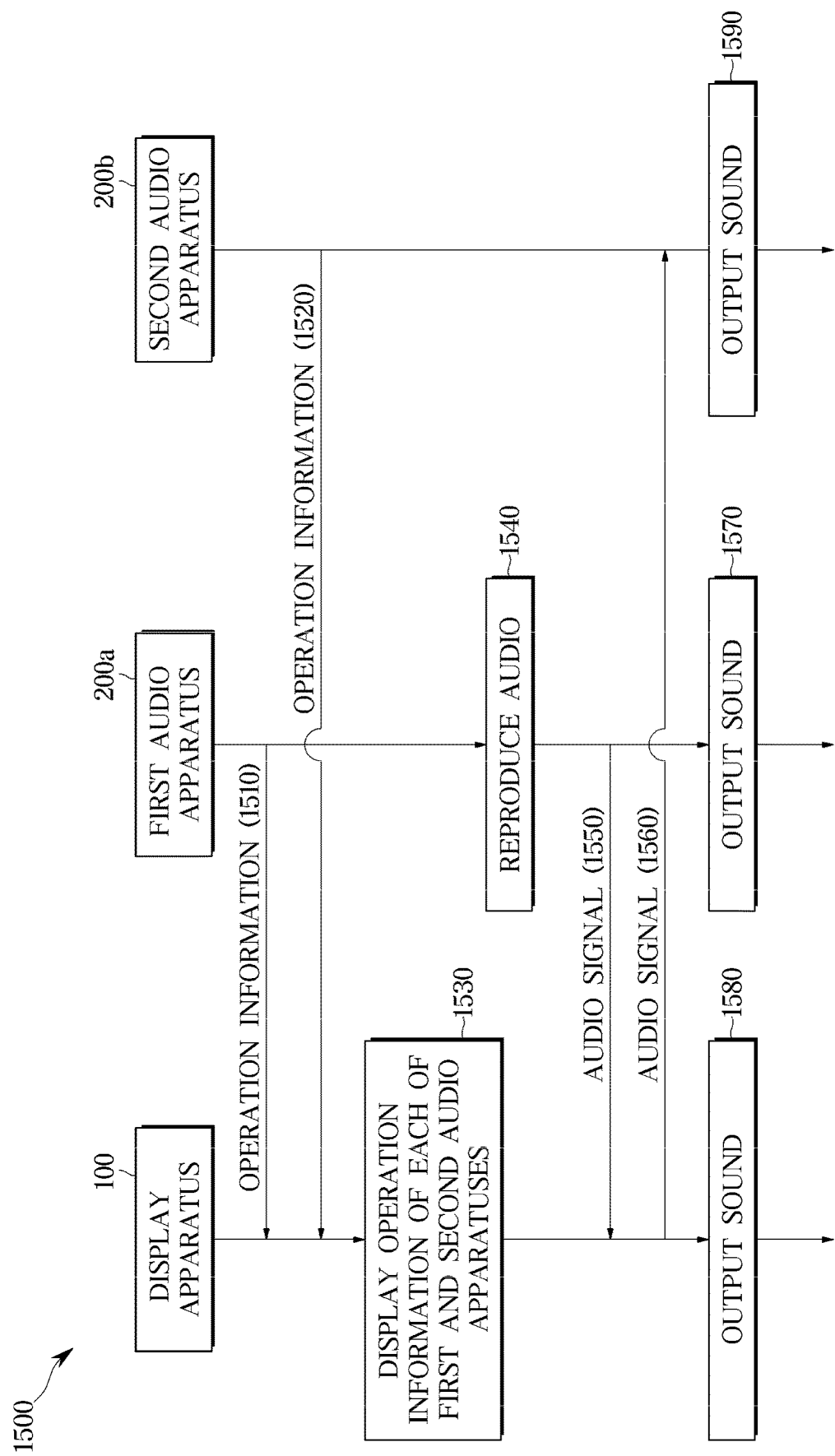
FIG. 15 illustrates operations of the display apparatus and the plurality of audio apparatuses according to an embodiment.
Figure 16:
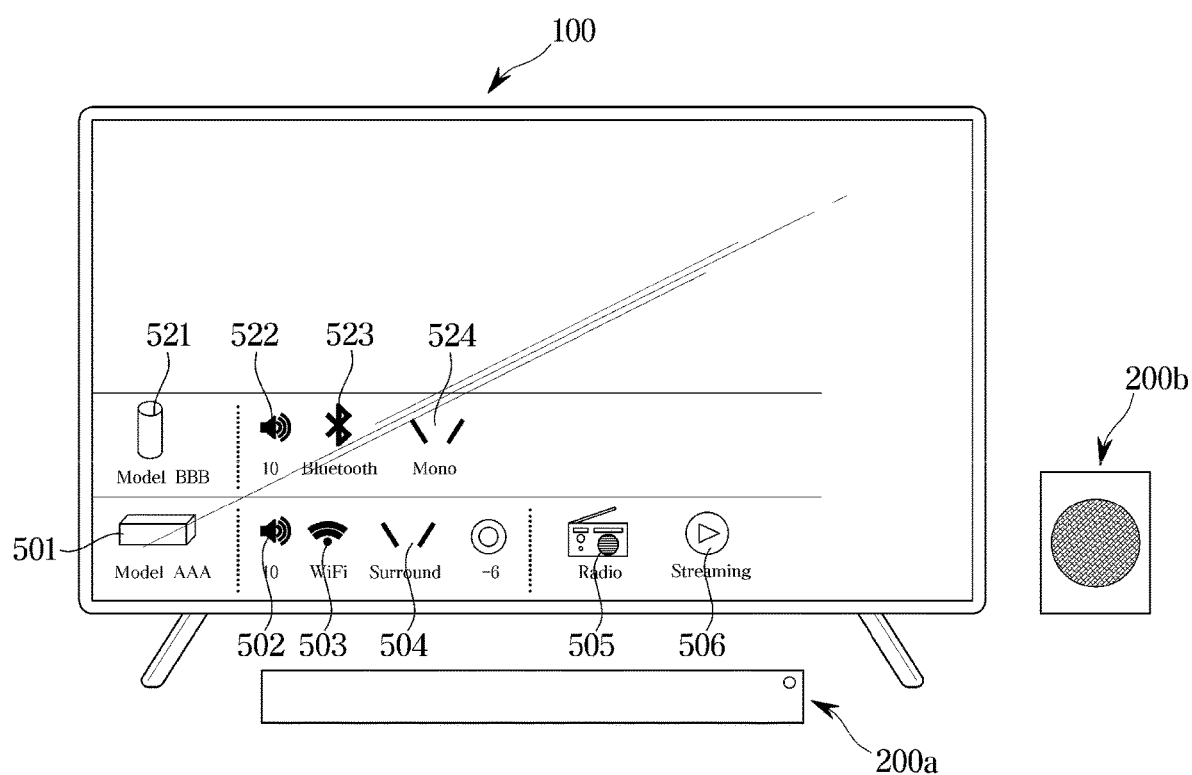
FIG. 16 illustrates an image displayed on the display apparatus according to the operation shown in FIG. 15.

FIG. 15 illustrates operations of the display apparatus and the plurality of audio apparatuses according to an embodiment. FIG. 16 illustrates an image displayed on the display apparatus according to the operation shown in FIG. 15.

Referring to FIGS. 15 and 16, an operation (1500) of the display apparatus 100 and the plurality of audio apparatuses 200a and 200b will be described.

The display apparatus 100 may be connected to the first and second audio apparatuses 200a and 200b, and may be set into an "on state" or a "standby state". In addition, the first and second audio apparatuses 200a and 200b may be set into an "on state".

The first audio apparatus 200a transmits operation information to the display apparatus 100, and the display apparatus 100 receives the operation information of the first audio apparatus 200a (1510).

Operation 1510 may be the same as operations 1010 and 1020 illustrated in FIG. 6.

The second audio apparatus 200b transmits operation information to the display apparatus 100, and the display apparatus 100 receives the operation information of the second audio apparatus 200b (1520).

Operation 1520 may be the same as operations 1010 and 1020 illustrated in FIG. 6.

The display apparatus 100 displays the operation information of the first audio apparatus 200a and the operation information of the second audio apparatus 200b (1530).

The controller 180 of the display apparatus 100 may control the display 150 such that a portion of the display panel 152 is activated, and the operation information of the first audio apparatus 200a and the operation information of the second audio apparatus 200b are displayed in the activated portion of the display panel 152.

Referring to FIG. 16, the controller 180 may control the display 150 such that the operation information of the first audio apparatus 200a and the operation information of the second audio apparatus 200b are displayed on a lower portion of the display panel 152. The controller 180 may control the display 150 such that image objects 501 and 521 respectively representing pieces of identification information about the first and second audio apparatuses 200a and 200b, image objects 502 and 522 respectively representing volumes of the speakers of the first and second audio apparatuses 200a and 200b, image objects 503 and 523 respectively representing connection methods of the first and second audio apparatuses 200a and 200b, and image objects 504 and 524 respectively representing sound output modes of the first and second audio apparatuses 200a and 200 are displayed.

The first audio apparatus 200a reproduces audio (1540).

Operation 1540 may be the same as operation 1340 illustrated in FIG. 11.

The first audio apparatus 200a transmits an audio signal based on the reproduction of the audio to the display apparatus 100, and the display apparatus 100 receives the audio signal from the first audio apparatus 200a (1550).

The controller of the first audio apparatus 200a may transmit the audio signal to the display apparatus 100 through the content interface and/or the communication interface, and the controller 180 of the display apparatus 100 may receive the audio signal.

The display apparatus 100 transmits the audio signal based on the audio production of the first audio apparatus 200a to the second audio apparatus 200b, and the second audio apparatus 200b receives the audio signal from the display apparatus 100 (1560).

The controller 180 of the display apparatus 100 may receive the audio signal based on the audio reproduction from the first audio apparatus 200a, and transmit the audio signal received from the first audio apparatus 200a to the second audio apparatus 200b through the content interface and/or the communication interface. The controller of the second audio apparatus 200b may receive the audio signal based on the audio reproduction of the first audio apparatus 200a.

The first audio apparatus 200a outputs sound according to the reproduced audio signal (1570).

The controller of the first audio apparatus 200a may control the speaker to convert the audio signal into sound and output the sound according to the audio signal.

The display apparatus 100 outputs sound according to the audio signal received from the first audio apparatus 200a (1580).

The controller 180 of the display apparatus 100 may control the speaker 140 to convert the audio signal into sound and output the sound according to the audio signal.

The second audio apparatus 200b outputs sound according to the audio signal received from the display apparatus 100 (1590).

The controller of the second audio apparatus 200b may control the speaker to convert the audio signal into sound and output the sound according to the audio signal.

As described above, the display apparatus 100 may be connected to the plurality of audio apparatuses 200a and 200b to display respective pieces of operation information of the plurality of audio apparatuses 200a and 200b. Accordingly, the display apparatus 100 may provide a user with detailed information of the plurality of audio apparatuses 200a and 200b that do not include a display panel.

In addition, the display apparatus 100 may receive an audio signal from one of the audio apparatuses 200a and 200b and transmit the received audio signal to another audio apparatus 200b. The display apparatus 100 and the plurality of audio apparatuses 200a and 200b may each output sound that is the same as or corresponds to each other between the display apparatus 100 and the plurality of audio apparatuses 200a and 200b. As a result, the display apparatus 100 and the plurality of audio apparatuses 200a and 200b may provide a user with richer sound compared to sound output by only one audio apparatus 200a.

Figure 17:
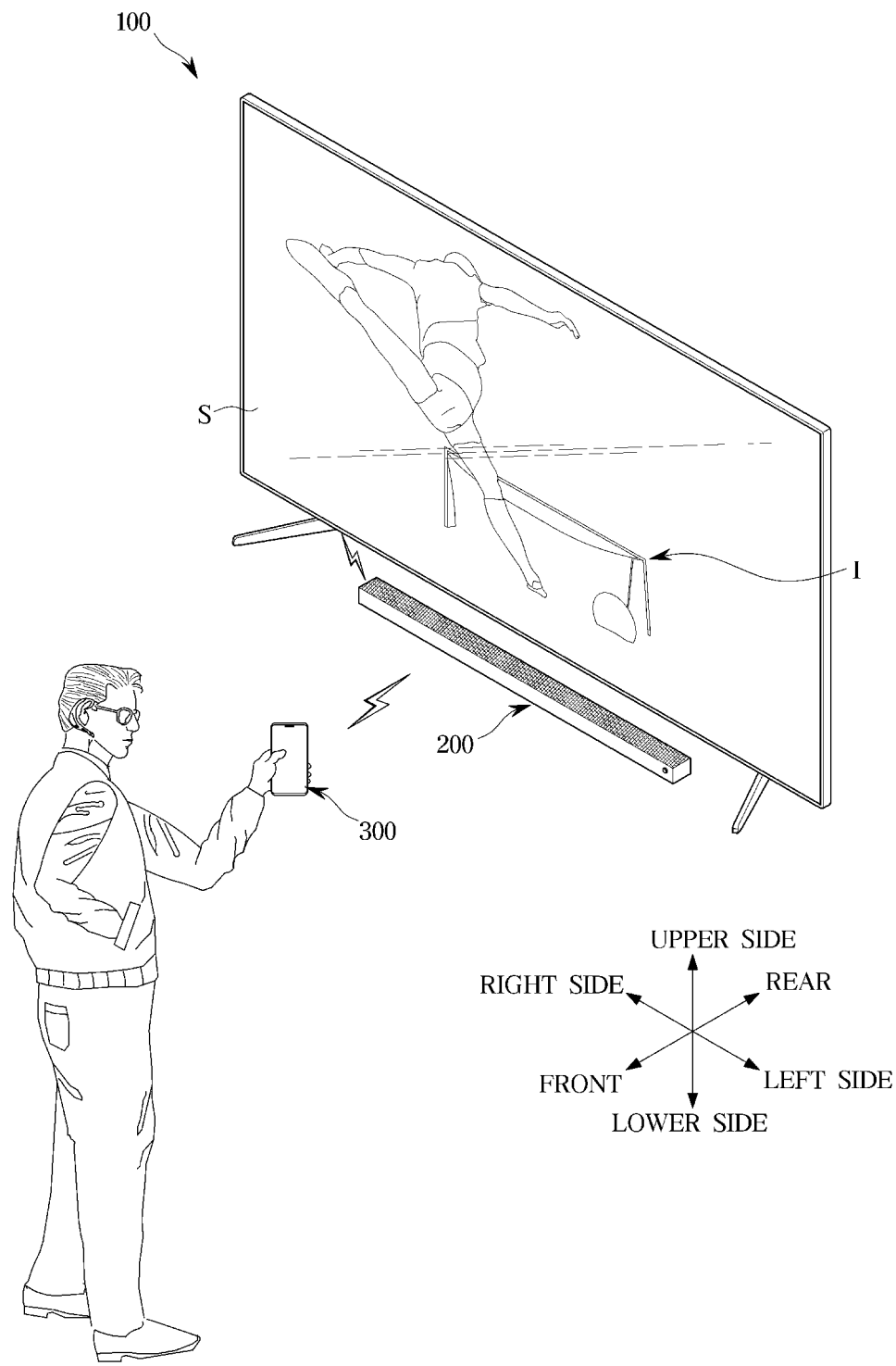
FIG. 17 illustrates a display apparatus, an audio apparatus connected to the display apparatus, and a user device connected to the audio apparatus according to an embodiment.

FIG. 17 illustrates a display apparatus, an audio apparatus connected to the display apparatus, and a user device connected to the audio apparatus according to an embodiment.

Referring to in FIG. 17, a display apparatus 100 may be connected to an audio apparatus 200 in a wired and/or wireless manner, and may output sound through the audio apparatus 200. The display apparatus 100 may be the same as the display apparatus shown in FIGS. 1, 2, 3, and 4, and the audio apparatus 200 may be the same as the audio apparatus shown in FIGS. 1 and 5.

In addition, a user device 300 may also be connected to the audio apparatus 200 in a wired and/or wireless manner, and may output sound through the audio apparatus 200. The user device 300 may be a computing device or a communication device that is provided separately from the display apparatus 100 to be carried by a user. For example, the user device 10 may be a handy terminal, a multimedia terminal, a personal digital assistant (PDA), a tablet computer, and a lap top computer, a smart watch, smart glasses, or the like.

The user device 300 may be connected to the audio apparatus 200 in a wireless manner. The user device 300 may transmit an audio signal to the audio apparatus 200, and the audio apparatus 200 may output sound according to the audio signal received from the user device 300.

The display apparatus 100 may be connected to the audio apparatus 200 through the content interface 120 and/or the communication interface 160, and the user device 300 may be connected to the audio apparatus 200 through the communication interface.

The display apparatus 100 may be connected to the audio apparatus 200 in a wired manner, and the user device 300 may be connected to the audio apparatus 200 in a wireless manner. For example, the display apparatus 100 may be connected to the audio apparatus 200 through a HDMI terminal, and the user device 300 may be connected to the audio apparatus 200 using Wi-Fi wireless communication or Bluetooth wireless communication.

In addition, the display apparatus 100 may be connected to the audio apparatus 200 in a wireless manner, and the user device 300 may be connected to the audio apparatus 200 in a wireless manner. For example, the display apparatus 100 may be connected to the audio apparatus 200 using Wi-Fi wireless communication or Bluetooth wireless communication, and the user device 300 may be connected to the audio apparatus 200 using Bluetooth wireless communication or Wi-Fi wireless communication. The user device 300 may be connected to the audio apparatus 200 using short-range wireless communication.

The user device 300 may be connected to the audio apparatus 200 through heterogeneous wireless communication. For example, the user device 300 may authenticate communication with the audio apparatus 200 using short-range wireless communication, and transmit an audio signal to the audio apparatus 200 using Bluetooth wireless communication.

As such, the audio apparatus 200 may be connected to each of the display apparatus 100 and the user device 300. The audio apparatus 200 may receive an audio signal from the display apparatus 100 and output sound according to the received audio signal. In addition, the audio apparatus 200 may receive an audio signal from the user device 300 and may output sound according to the received audio signal.

Figure 18:
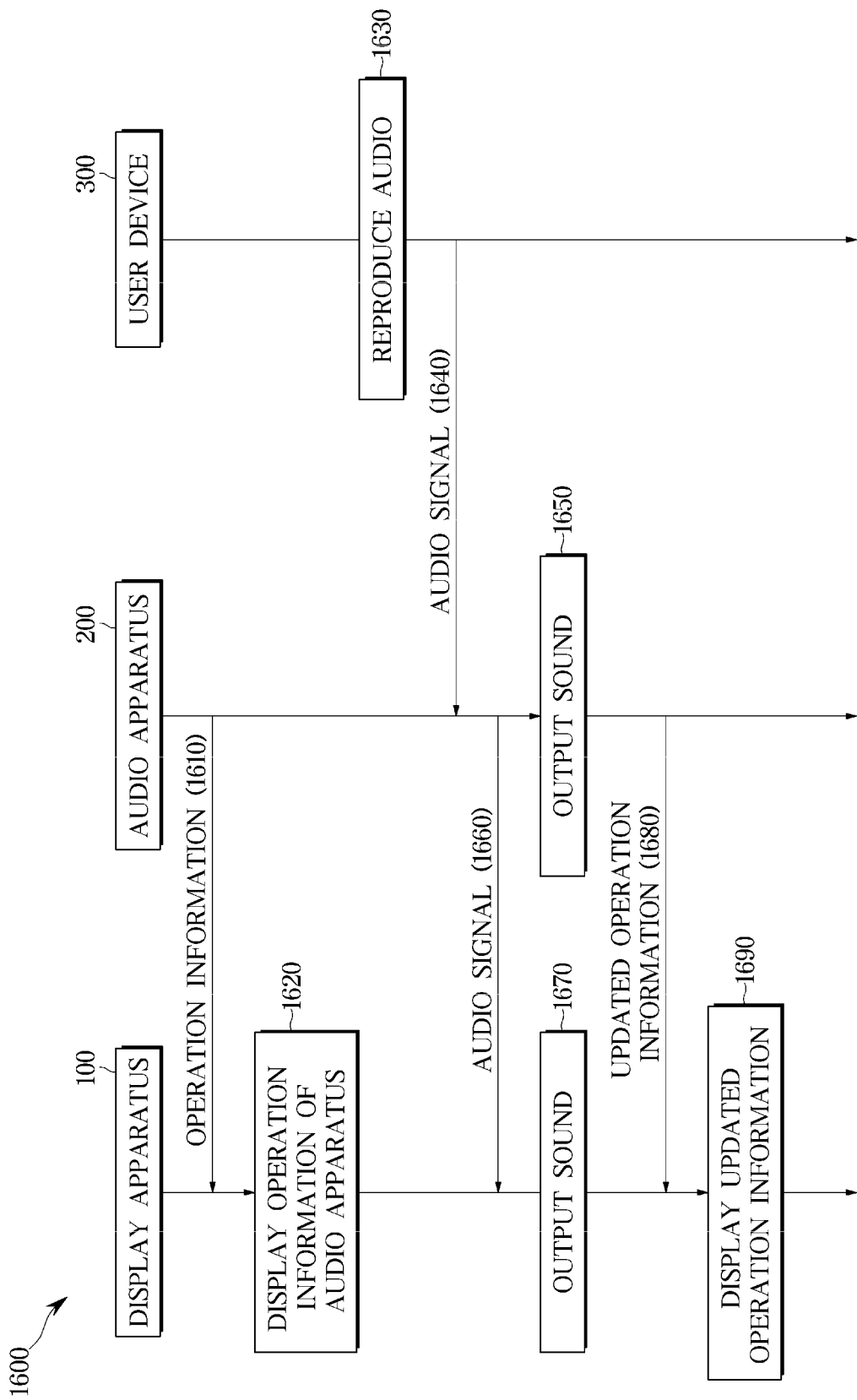
FIG. 18 illustrates operations of the display apparatus, the audio apparatus, and the user device according to an embodiment.

FIG. 18 illustrates operations of the display apparatus, the audio apparatus, and the user device according to an embodiment.

Referring to FIG. 18, an operation (1600) of the display apparatus 100, the audio apparatus 200, and the user device 300 will be described.

The display apparatus 100 may be connected to the audio apparatus 200 and may be set into an "on state" or a "standby state". In addition, the audio apparatus 200 may be set into an "on state". The user device 300 may be connected to the audio apparatus 200.

The audio apparatus 200 transmits operation information to the display apparatus 100, and the display apparatus 100 receives the operation information of the audio apparatus 200 (1610).

Operation 1610 may be the same as operations 1010 and 1020 illustrated in FIG. 6.

The display apparatus 100 displays the operation information of the audio apparatus 200 (1620).

Operation 1620 may be the same as operation 1030 illustrated in FIG. 6.

The user device 300 reproduces audio (1630).

While the display apparatus 100 is displaying the operation information of the audio apparatus 200, the user device 300 may reproduce audio in response to a user input. For example, the user may input a user input for reproducing audio through a user interface of the user device 300. The user device 30 may reproduce audio in response to a user input.

The user device 300 transmits an audio signal based on the audio reproduction to the audio apparatus 200, and the audio apparatus 200 receives the audio signal from the user device 300 (1640).

The user device 300 may reconstruct an audio signal from an audio file or reconstruct an audio signal from a radio broadcast signal, and transmit the audio signal to the audio apparatus 200 through a communication interface.

The controller 280 of the audio apparatus 200 may receive the audio signal from the user device 300 through the communication interface 260.

The audio apparatus 200 outputs sound according to the audio signal (1650).

The controller 280 of the audio apparatus 200 may control the speaker 240 to convert the audio signal received from the user device 300 into sound and output the sound according to the audio signal.

The audio apparatus 200 transmits the audio signal to the display apparatus 100, and the display apparatus 100 receives the audio signal from the audio apparatus 200 (1660). In addition, the display apparatus 100 outputs sound according to the audio signal (1670).

Operations 1660 and 1670 may be the same as operations 1350, 1370 and 1380 shown in FIG. 11.

The audio apparatus 200 transmits updated operation information to the display apparatus 100, and the display apparatus 100 receives the updated operation information of the audio apparatus 200 (1680). In addition, the display apparatus 100 displays the updated operation information of the audio apparatus 200 (1690).

Operations 1680 and 1690 may be the same as operations 1050, 1060, and 1070 in FIG. 6.

As described above, the display apparatus 100 may output sound according to an audio signal reproduced by the user device 300 together with the audio apparatus 200. In other words, the display apparatus 100 may assist the audio apparatus 200 that outputs audio of the user device 300. As the display apparatus 100 outputs sound that is the same as or corresponds to sound output by the audio apparatus 200, the display apparatus 100 and the audio apparatus 200 may provide a user with richer sound compared to sound output by only the audio apparatus 200.

Figure 19:
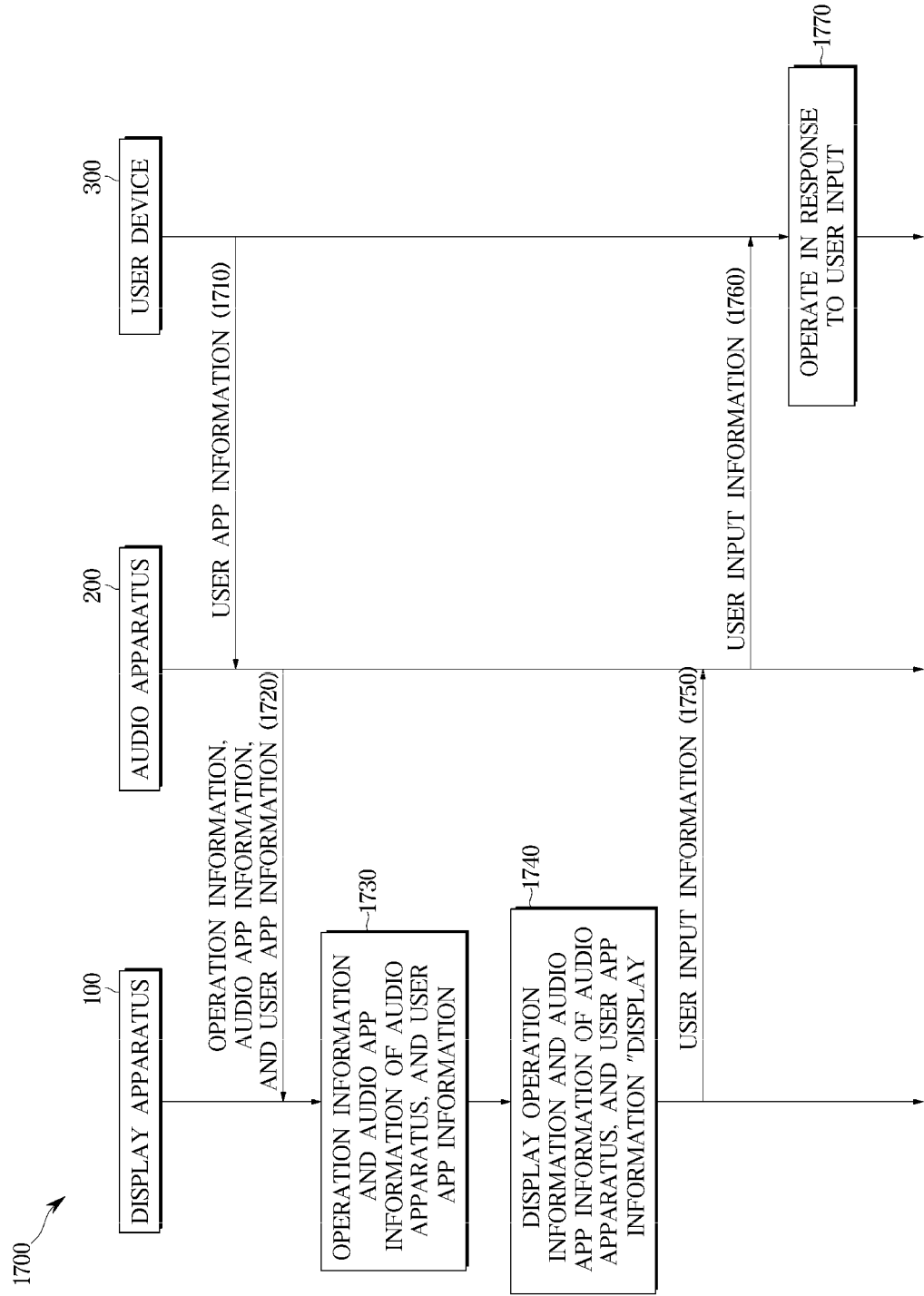
FIG. 19 illustrates operations of the display apparatus, the audio apparatus, and the user device according to an embodiment.
Figure 20:
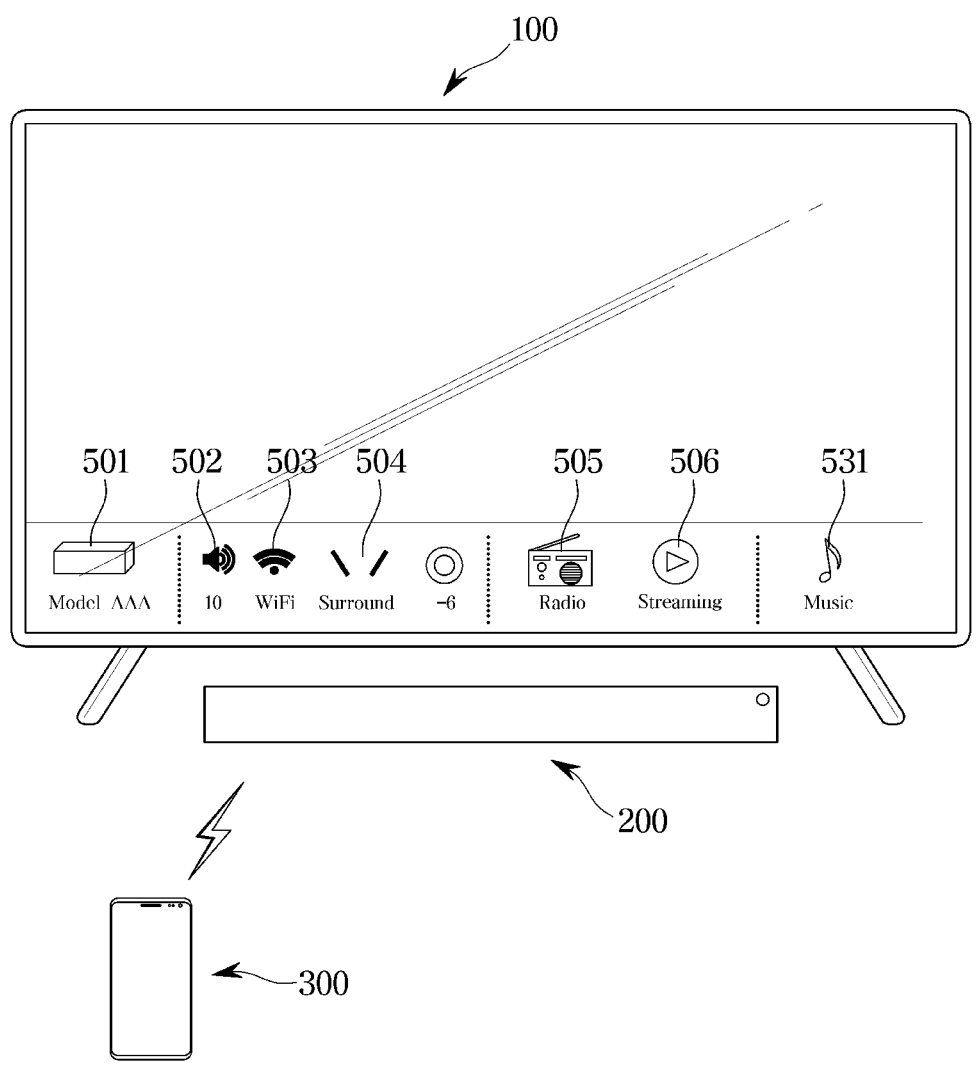
FIG. 20 illustrates an image displayed on the display apparatus according to the operation shown in FIG. 19.

FIG. 19 illustrates operations of the display apparatus, the audio apparatus, and the user device according to an embodiment. FIG. 20 illustrates an image displayed on the display apparatus according to the operation shown in FIG. 19.

Referring to FIGS. 19 and 20, an operation (1700) of the display apparatus 100, the audio apparatus 200, and the user device 300 will be described.

The display apparatus 100 may be connected to the audio apparatus 200 and may be set into an "on state" or a "standby state". The audio apparatus 200 may be set into an "on state". In addition, the user device 300 may be connected to the audio apparatus 200.

The user device 300 transmits information about an application related to audio reproduction (hereinafter, referred to as 'user application information') to the audio apparatus 200, and the audio apparatus 200 receives the user application information from the user device 300 (1710).

The user device 300 may collect information (user application information) related to reproduction of audio stored in a storage or memory. The user device 300 may store an Internet radio app that reproduces Internet audio streaming (internet music broadcast), an audio player that reproduces an audio file stored in an internal storage or an external storage, and the like.

The user device 300 may transmit the user application information to the audio apparatus 200 through a communication interface. For example, the user device 300 may transmit the user application information using Bluetooth wireless communication.

The controller 280 of the audio apparatus 200 may receive the user application information of the user device 300 through the communication interface 260.

The audio apparatus 200 transmits operation information and audio application information of the audio apparatus 200, and user application information to the display apparatus 100, and the display apparatus 100 receives the operation information and the audio application information of the audio apparatus 200 and the user application information from the audio apparatus 200 (1720).

The controller 280 of the audio apparatus 200 may collect the operation information about the audio apparatus 200 including identification information of the audio apparatus 200, a volume of the speaker 240, a connection method with the display apparatus 100, and a sound output mode of the speaker 240. In addition, the controller 280 may also collect information (audio application information) related to audio reproduction stored in the storage 270 or the memory 282.

The audio apparatus 200 may transmit the operation information and the audio application information of the audio apparatus 200, and the user application information received from the user device 300 to the display apparatus 100 through the content interface 220 and/or the communication interface 260.

The controller 180 of the display apparatus 100 may acquire the operation information and the audio application information of the audio apparatus 200, and the user application information through the content interface 120 and/or the communication interface 160.

The display apparatus 100 displays the operation information and the audio application information of the audio apparatus 200, and the user application information (1730).

The controller 180 of the display apparatus 100 may control the display 150 to display the operation information and the audio application information of the audio apparatus 200, and the user application information on a portion of the display panel 152. For example, as shown in FIG. 20, the controller 180 may control the display 150 to display image objects (or control menus) 501, 502, 503, 504, 505, and 506 representing the operation information/audio application information of the audio apparatus 200, an image object (or a control menu) 531 representing an audio player that reproduces an audio file of the user device 300, and a playlist of the audio player on a lower portion of the display panel 152.

While the display apparatus 100 is displaying the operation information and the audio application information of the audio apparatus 200, and the user application information, the display apparatus 100 acquires a user input for the user device 300 (1740).

A user may input a user input for the user device 300 through the user inputter 110 of the display apparatus 100. For example, the user may input a user input for executing the audio player of the user device 300 through the remote control 112a of the display apparatus 100.

The user may select the image object (or control menu) 531 representing the audio player indicating the sound volume of the audio apparatus 200 and execute the audio player of the user device 300 using the remote control 112a. In other words, the image object (or control menu) 531 may serve as a control menu for acquiring a user input.

The controller 180 of the display apparatus 100 may acquire a user input for the user device 300 through the user inputter 110.

The display apparatus 100 transmits information about the user input (hereinafter, referred to as 'user input information') to the audio apparatus 200, and the audio apparatus 200 receives the user input information from the display apparatus 100 (1750).

Operation 1750 may be the same as operations 1150 and 1160 illustrated in FIG. 8.

The audio apparatus 200 transmits the user input information to the user device 300, and the user device 300 receives the user input information from the audio apparatus 200 (1760).

The audio apparatus 200 may transmit the user input information to the user device 300 through the communication interface 260, and the user device 300 may receive the user input information from the audio apparatus 300.

The user device 300 operates in response to the user input inputted to the display apparatus 100 (1770).

The user device 300 may receive the user input information and acquire the user input on the basis of the user input information.

The user device 300 may execute a user application in response to the user input through the display apparatus 100. For example, the user device 300 may execute an audio player in response to the user input through the display apparatus 100. In addition, an audio signal reproduced by the audio player of the user device 300 may be transmitted to the audio apparatus 200, and the audio apparatus 200 may output sound according to the audio signal.

As such, in order for the display apparatus 100 to display the user application information of the user device 300 and to control the user device 300 using a user input through the display apparatus 100, a specific authentication procedure between the display apparatus 100 and the user device 300 may be required.

For example, when the user device 300 is disposed in a position close to the display apparatus 100, the user device 300 may transmit information (hereinafter referred to as 'authentication information'), e.g., an authentication code or a password, for authentication to the display apparatus 100 using short-range wireless communication The display apparatus 100 may receive the authentication information using short-range wireless communication, and transmit the authentication information to the audio apparatus 200 together with the user input information.

As described above, the display apparatus 100 may display user application information of the user device 300 and acquire a user input from a user. Accordingly, the display apparatus 100 may allow a user to control the user device 300 through the user inputter 110 of the display apparatus 100. In addition, while listening to audio of the user device 300, a user may control an operation related to the audio of the user device 300 through the display apparatus 100 without directly manipulating the user device 300.

The display apparatus according to the embodiment may include a display, a content interface configured to receive a broadcast signal, a communication interface, and a controller electrically connected to the display, the content interface, and the communication interface, wherein the controller is configured to control the display to display an image corresponding to the broadcast signal received through the content interface, receive operation information of an external audio apparatus through at least one interface selected from the content interface and the communication interface, and control the display to display a control menu for representing the operation information of the external audio apparatus and controlling the external audio apparatus on the basis of the operation information of the external audio apparatus.

Accordingly, the display apparatus may provide a user with detailed information about the audio apparatus that does not include a display panel. Even when the audio apparatus includes a display panel, the display apparatus may display detailed information about the audio apparatus on the display panel with a high visibility, so that the user may easily acquire information about the audio apparatus through the display apparatus.

The controller may be configured to acquire a user input for controlling the external audio apparatus through the control menu displayed on the display and the user input inputter, and transmit the user input to the external audio apparatus through the at least one interface. In detail, the controller may be configured to receive information about an application related to audio reproduction of the external audio apparatus through the at least one interface, display another control menu for representing information about the application of the external audio apparatus and executing the application of the external audio apparatus, acquire another user input for executing the application through the another control menu displayed on the display and the user inputter, and transmit the another user input to the external audio apparatus through the at least one interface.

Accordingly, the display apparatus may allow a user to control the audio apparatus through the user inputter of the display apparatus. The display apparatus may display various images through the display, so that a user may check various settings and commands that may be inputable to the audio apparatus through the display. In addition, the user may control the audio apparatus using the remote control of the display apparatus at a remote site.

The controller may turn off the display in response to a time of displaying the control menu on the display that is longer than or equal to a reference time.

Accordingly, the display apparatus may reduce the amount of power consumed for displaying operation information of the audio apparatus.

The controller may be configured to receive an audio signal from the external audio apparatus through the at least one interface, and control a speaker to output sound according to the received audio signal through the speaker.

Accordingly, the display apparatus may assist the audio apparatus. As the display apparatus outputs sound that is the same as or corresponds to the sound of the audio apparatus, the display apparatus and the audio apparatus may provide a user with sound that is richer than the sound output only by the audio apparatus.

The controller may be configured to receive an audio signal from the external audio apparatus through the at least one interface, and control the display to display an image that visualizes the received audio signal.

Accordingly, the display apparatus may provide a user with information about a location and/or direction in which sound is output from the audio apparatus.

The controller may be configured to receive operation information of another audio apparatus through another interface selected from the content interface and the communication interface, and control the display to display another control menu for representing the operation information of the another audio apparatus and controlling the another audio apparatus. In addition, the controller may be configured to receive an audio signal from the external audio apparatus through the at least one interface, and transmit the received audio signal to the another audio apparatus through the another interface.

Accordingly, the display apparatus may provide a user with detailed information of a plurality of audio apparatuses that do not include a display panel. In addition, the display apparatus and the plurality of audio apparatuses may provide a user with richer sound as compared to the sound output by only one audio apparatus.

The controller may be configured to receive an audio signal of an external user device communicating with the external audio apparatus from the external audio apparatus through the at least one interface; and output sound according to the received audio signal of the external user device through the speaker.

Accordingly, the display apparatus may assist the audio apparatus that outputs audio of the user device. As the display apparatus outputs sound that is the same as or corresponds to sound output by the audio apparatus, the display apparatus and the audio apparatus may provide a user with sound that is richer than the sound output by only the audio apparatus.

The controller may be configured to: receive information about an application related to audio reproduction of an external user device communicating with the external audio apparatus from the external audio apparatus through the at least one interface, display another control menu for representing information about the application of the external user device and executing the application of the external user device, acquire another user input for executing the application of the external user device through the another control menu displayed on the display and the user inputter, and transmit the another user input to the external audio apparatus through the at least one interface such that the another user input is transmitted to the external user device.

Accordingly, the display apparatus may allow a user to control the user device through the user inputter of the display apparatus. In addition, while listening to audio of the user device, a user may control an operation related to the audio of the user device through the display apparatus without directly manipulating the user device.

Exemplary embodiments of the present disclosure have been described above. In the exemplary embodiments described above, some components may be implemented as a "module". Here, the term 'module' means, but is not limited to, a software and/or hardware component, such as a Field Programmable Gate Array (FPGA) or Application Specific Integrated Circuit (ASIC), which performs certain tasks. A module may advantageously be configured to reside on the addressable storage medium and configured to execute on one or more processors.

Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The operations provided for in the components and modules may be combined into fewer components and modules or further separated into additional components and modules. In addition, the components and modules may be implemented such that they execute one or more CPUs in a device.

With that being said, and in addition to the above described exemplary embodiments, embodiments can thus be implemented through computer readable code/instructions in/on a medium, e.g., a computer readable medium, to control at least one processing element to implement any above described exemplary embodiment. The medium can correspond to any medium/media permitting the storing and/or transmission of the computer readable code.

The computer-readable code can be recorded on a medium or transmitted through the Internet. The medium may include Read Only Memory (ROM), Random Access Memory (RAM), Compact Disk-Read Only Memories (CD-ROMs), magnetic tapes, floppy disks, and optical recording medium. Also, the medium may be a non-transitory computer-readable medium. The media may also be a distributed network, so that the computer readable code is stored or transferred and executed in a distributed fashion. Still further, as only an example, the processing element could include at least one processor or at least one computer processor, and processing elements may be distributed and/or included in a single device.

While exemplary embodiments have been described with respect to a limited number of embodiments, those skilled in the art, having the benefit of this disclosure, will appreciate that other embodiments can be devised which do not depart from the scope as disclosed herein. Accordingly, the scope should be limited only by the attached claims.

What is claimed is:

1. A display apparatus comprising:
   a display;
   a content interface;
   a communication interface; and
   a controller configured to:
      control the display to display an image corresponding to a broadcast signal received through the content interface;
      receive operation information of an external audio apparatus through at least one interface selected from the content interface and the communication interface;
      control the display to display a first control menu identifying the operation information of the external audio apparatus and through which an operation of the external audio apparatus is controllable based on the operation information of the external audio apparatus and an operation information of the display apparatus;

control the display to display a second control menu representing information about an application of the external audio apparatus, the second control menu being selectable to control the application of the external audio apparatus for audio reproduction of the external audio apparatus;

control the display to display a third control menu representing information about an application of an external user device communicating with the external audio apparatus, the third control menu being selectable to control the application of the external user device for audio reproduction of the external user device; and control audio reproduction of the external audio apparatus and the external user device based on an input received through the first control menu, the second control menu, and the third control menu, which are displayed simultaneously on the display of the display apparatus, by respectively executing the application of the external audio apparatus and the application related to audio reproduction of the external user device according to the input.

2. The display apparatus of claim 1, wherein the input received is a user input and the display apparatus further comprises a user inputter, wherein the controller is configured to:
acquire the user input to control the external audio apparatus through the first control menu displayed on the display, the user input being received from the user inputter; and
transmit the user input to the external audio apparatus through the at least one interface.

3. The display apparatus of claim 2, wherein the controller is configured to:
receive information about the application related to audio reproduction of the external audio apparatus through the at least one interface;
acquire another user input for executing the application through the second control menu displayed on the display, the other user input being received from the user inputter; and
transmit the other user input to the external audio apparatus through the at least one interface.

4. The display apparatus of claim 1, wherein the controller is configured to turn off the display in response to a time of displaying the first control menu, the second control menu, and the third control menu on the display being longer than or equal to a reference time.

5. The display apparatus of claim 1, further comprising a speaker,
wherein the controller is configured to:
receive an audio signal from the external audio apparatus through the at least one interface; and
output sound according to the received audio signal through the speaker.

6. The display apparatus of claim 1, wherein the controller is configured to:
receive an audio signal from the external audio apparatus through the at least one interface; and
control the display to display an image that visualizes the received audio signal.

7. The display apparatus of claim 1, wherein the controller is configured to:

receive operation information of another audio apparatus through another interface selected from the content interface and the communication interface; and
control the display to display another control menu for providing the operation information of the another audio apparatus and controlling the another audio apparatus.

8. The display apparatus of claim 7, wherein the controller is configured to:
receive an audio signal from the external audio apparatus through the at least one interface; and
transmit the received audio signal to the another audio apparatus through the another interface.

9. The display apparatus of claim 1, further comprising a speaker,
wherein the controller is configured to:
receive an audio signal of the external user device communicating with the external audio apparatus from the external audio apparatus through the at least one interface; and
output sound according to the received audio signal of the external user device through the speaker.

10. The display apparatus of claim 1, further comprising, wherein the controller is configured to:
receive the information about the application for audio reproduction of the external user device communicating with the external audio apparatus from the external audio apparatus through the at least one interface;
acquire a user input for executing the application of the external user device through the third control menu displayed on the display; and
transmit the user input to the external audio apparatus through the at least one interface such that another user input is transmitted to the external user device.

11. A method of controlling a display apparatus including a communication interface and a content interface, the method comprising:
displaying, on a display, an image corresponding to a broadcast signal received through the content interface;
receiving operation information of an external audio apparatus through at least one interface selected from the content interface and the communication interface;
displaying, on the display, a first control menu identifying the operation information of the external audio apparatus and through which an operation of the external audio apparatus is controllable based on the operation information of the external audio apparatus and an operation information of the display apparatus;
displaying, on the display, a second control menu representing information about an application of the external audio apparatus, the second control menu being selectable to control the application of the external audio apparatus for audio reproduction of the external audio apparatus;
displaying, on the display, a third control menu representing information about an application of an external user device communicating with the external audio apparatus, the third control menu being selectable to control the application of the external user device for audio reproduction of the external user device; and
controlling audio reproduction of the external audio apparatus and the external user device based on an input received through the first control menu, the second control menu, and the third control menu, which are displayed simultaneously on the display of the display apparatus, by respectively executing the application of the external audio apparatus and the application related to audio reproduction of the external user device according to the input.

12. The method of claim 11, wherein the input received is a user input and the display apparatus further comprises:
   acquiring a user input for controlling the external audio apparatus through the control menu displayed on the display, the user input being received from a user inputter; and
   transmitting the user input to the external audio apparatus through the at least one interface.

13. The method of claim 12, further comprising:
   receiving the information about the application related to audio reproduction of the external audio apparatus through the at least one interface;
   acquiring another user input for executing the second control menu displayed on the display and the application; and
   transmit the other user input to the external audio apparatus through the at least one interface.

14. The method of claim 11, further comprising turning off the display in response to a time of displaying the first control menu, the second control menu, and the third control menu on the display being longer than or equal to a reference time.

15. The method of claim 11, further comprising:
   receiving an audio signal from the external audio apparatus through the at least one interface; and
   outputting sound according to the received audio signal through a speaker of the display apparatus.

16. The method of claim 11, further comprising:
   receiving an audio signal from the external audio apparatus through the at least one interface; and
   controlling the display to display an image that visualizes the received audio signal.

17. The method of claim 11, further comprising:
   receiving operation information of another audio apparatus through another interface selected from the content interface and the communication interface; and
   controlling the display to display another control menu for providing the operation information of the other audio apparatus and controlling the other audio apparatus.

18. The method of claim 17, further comprising:
   receiving an audio signal from the external audio apparatus through the at least one interface; and
   transmitting the received audio signal to the other audio apparatus through the another interface.

19. The method of claim 11, further comprising:
   receiving the information about the application related to audio reproduction of the external user device communicating with the external audio apparatus from the external audio apparatus through the at least one interface;
   acquiring a user input for executing the application of the external user device through the other control menu displayed on the display, the user input being received form a user inputter; and
   transmitting the user input to the external audio apparatus through the at least one interface such that the user input is transmitted to the external user device.

20. A display apparatus comprising:
   a display;
   a user inputter;
   a content interface to receive a broadcast signal from a content source and exchange data with an external audio apparatus;
   a communication interface to exchange data with the external audio apparatus; and
   a controller configured to:
      control the display to display an image corresponding to the broadcast signal received through the content interface;
      receive information about an application related to audio reproduction of an external user device communicating with the external audio apparatus from the external audio apparatus through at least one interface selected from the content interface and the communication interface;
      display a first control menu identifying information about the application of the external user device and through which an operation of the application of the external user device is controllable based on an operation information of the external audio apparatus and an operation information of the display apparatus;
      acquire a user input, input to the user inputter, for executing the application of the external user device through the first control menu displayed on the display;
      transmit the user input to the external audio apparatus through the at least one interface such that the user input is transmitted to the external user device;
      control the display to display a second control menu representing information about an application of the external audio apparatus, the second control menu being selectable to control the application of the external audio apparatus for audio reproduction of the external audio apparatus;
      control the display to display a third control menu for representing information about an application of an external user device communicating with the external user device, the third control menu being selectable to control the application of the external user device for audio reproduction of the external audio apparatus; and
      control audio reproduction of the external audio apparatus and the external user device based on the user input, input to the user inputter, in association with the first control menu, the second control menu, and the third control menu, which are displayed simultaneously on the display of the display apparatus, by respectively executing the application of the external audio apparatus and the application related to audio reproduction of the external user device according to the input.

* * * * *